(12) United States Patent
Sakamoto et al.

(10) Patent No.: US 6,324,081 B1
(45) Date of Patent: Nov. 27, 2001

(54) SWITCHING POWER SOURCE APPARATUS

(75) Inventors: Hiroshi Sakamoto; Kenji Iwai, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/693,124

(22) Filed: Oct. 20, 2000

(30) Foreign Application Priority Data

Oct. 21, 1999 (JP) .................................................. 11-299884

(51) Int. Cl.⁷ ................................................. H02M 3/335
(52) U.S. Cl. ................................ 363/25; 363/97; 363/131
(58) Field of Search ................................. 363/19, 97, 131, 363/21.02, 24, 25, 22, 23

(56) References Cited

U.S. PATENT DOCUMENTS

| | | | |
|---|---|---|---|
| 4,446,405 | 5/1984 | Willis | 315/411 |
| 5,216,585 | * | 6/1993 | Yasumura | 363/19 |

FOREIGN PATENT DOCUMENTS 2041668  9/1980  (GB) ................................. H03K/4/62

* cited by examiner

Primary Examiner—Peter S. Wong
Assistant Examiner—Gary L. Laxton
(74) Attorney, Agent, or Firm—Jay H. Maioli

(57) ABSTRACT

A switching power source apparatus reduces power loss and improves conversion efficiency of a switching power source part by rectifying and smoothing a commercially available alternating power source supplied to an oscillation drive circuit and a switching circuit part that constitutes a half-bridge circuit. An output of the half-bridge circuit is grounded via a resonance capacitor, a choke coil, and a primary winding of an insulated type converter transformer. This converter transformer has a secondary winding for obtaining a +B voltage and high-voltage windings for obtaining a high-level output voltage. Further, fluctuation in the voltage of the high-level output voltage is supplied to the oscillation drive circuit via resistors, a control circuit, and a photo-coupler, whereby the switching circuit part is controlled. The secondary winding is connected in series to a saturable reactor, so that by controlling the inductance of this saturable reactor, the +B voltage taken out from the secondary winding is controlled.

10 Claims, 11 Drawing Sheets

I1
fo  fsw  f

SWITCHING POWER SOURCE APPARATUS

BACKGROUND OF THE INVENTION

1. Field of the Invention

The present invention relates to a switching power source apparatus that is suitably used in a computer display monitor or a large-sized television image receiver in which a high resolution video signal is displayed using, for example, a cathode ray tube. More particularly, the invention is intended, in a display monitor or television image receiver, which uses, for example, a cathode ray tube, to enable the generation of a plurality of voltages including the generation of a high voltage efficiently.

2. Description of the Related Art

As a power source apparatus used in a computer display monitor, etc. for making display of a video signal having a high resolution, there has hitherto been used an apparatus such as that illustrated in FIG. 9. This apparatus uses an insulated type switching power source circuit, a horizontal deflection circuit, and a high-voltage generation circuit.

Namely, in FIG. 9, a commercially available alternating power source (AC) 100 is connected to a smoothing capacitor 102 through a diode bridge rectification circuit 101. A negative-polarity end of the capacitor 102 is grounded and a positive-polarity end thereof is connected to an oscillation drive circuit 104 through a resistor 103. This positive-polarity end of the capacitor 102 is grounded through a switching circuit part 105 comprised of a serial circuit of switching elements Qa1 and Qa2. And, these switching elements Qa1 and Qa2 are driven so that these elements may be alternately made conductive by a prescribed frequency by the oscillation drive circuit 104.

Further, the switching circuit part 105 constitutes a half-bridge circuit; the positive-polarity end of the capacitor 102 is connected to the drain of the switching element Qa1; and the source of the switching element Qa2 is grounded. Also, to the switching elements Qa1 and Qa2 there are respectively connected in parallel damper diodes Da1 and Da2. And, a point of connection between the source of the switching element Qa1 and the drain of the switching element Qa2 is grounded through a resonance capacitor 106, a choke coil 107, and a primary winding La1 of an insulated type converter transformer 108.

As a result of this, into the primary winding La1 of the converter transformer 108 there is made to flow a resonance current that is inverted according to the oscillating frequency of the oscillation drive circuit 104. Thereby, a so-called "separately-excited type" of current-resonance type of converter power source circuit is constructed. Namely, in this circuit, the fundamental operation on a primary side of the converter transformer 108, when typically illustrated, is as illustrated in FIGS. 10A to 10C. In these FIGS. 10A to 10C, an equivalent circuit that is prepared when the switching element Qa1 has been made "on" by a drive pulse output from the oscillation drive circuit 104 illustrated in FIG. 10A is illustrated in FIG. 10B. And, an equivalent circuit that is prepared when the switching element Qa2 has been made "on" by that drive pulse is illustrated in FIG. 10C.

On this account, when the switching element Qa1 has been made "on", a switch 201 corresponding to the switching element Qa1 in the equivalent circuit in FIG. 10B is closed. Therefore, there is constructed a serial resonance circuit that is comprised of a direct current voltage source 203 corresponding to the positive-polarity end of the capacitor 102, the resonance capacitor 106, an inductor 204 including the choke coil 107 and primary winding La1, and a resistor 205. And, using the direct current voltage source 203 as a power source, a positive-polarity resonance current is made to flow through that circuit by way of the switch 201.

Next, when the switching element Qa2 has been made "on", a switch 202 corresponding to the switching element Qa2 in the equivalent circuit in FIG. 10C is closed. Therefore, by way of this switch 202, a negative-polarity resonance current is made to flow through the serial resonance circuit that is comprised of the resonance capacitor 107, the inductor 204, and the resistor 205. And, in this way, the positive-polarity and negative-polarity resonance currents are alternately generated according to the drive pulses output from the oscillation drive circuit 104, whereby a desired frequency of alternating current is made to flow through the serial resonance circuit.

Further, the waveforms of the currents flowing through respective portions of each of the equivalent circuits illustrated in FIGS. 10A to 10C are illustrated in FIGS. 11A to 11C. Here, FIG. 11A and FIG. 11B illustrate the waveforms of the current IQ1 and current IQ2 flowing, respectively, through the switching elements Qa1 and Qa2 while FIG. 11C illustrates the waveform of a resonance current I1 flowing through the serial resonance circuit. Also, in FIG. 12, illustration is made of the relationship between the resonance current I1 flowing through the serial resonance circuit and the frequency f. In FIG. 12, f0 represents the resonance frequency of the serial resonance circuit of FIGS. 10A to 10C and fsw represents the repetitive operating frequency of the switching circuit part 105 that is driven by the oscillation drive circuit 104.

In this case, assume that C, L, and R represent the values of the resonance capacitor 106, inductor 204, and resistor 205, respectively, and that Z represents the impedance of the serial resonance circuit with respect to each frequency $\omega$. Determining the admittance under this assumption, the admittance Y is expressed in the form of the following [equation no. 1].

$$Y = 1/Z = \frac{R - j(\omega L - 1/\omega C)}{R^2 + (\omega L - 1/\omega C)^2} \quad \text{[Equation No. 1]}$$

On the other hand, the resonance frequency f0 of the serial resonance circuit is expressed in the form of the following [equation no. 2].

$$f0 = \frac{1}{2\pi\sqrt{(LC)}} \quad \text{[Equation No. 2]}$$

Here, because the current I is in proportion to the Y of the [equation no. 1], when showing the magnitude of the current I1 as measured with respect to the frequency by the use of that Y, the variation thereof is as indicated by a curve of FIG. 12. The resonance current has a maximum value at the resonance frequency f0. Also, the repetitive operating frequency fsw of the switching circuit part 105 comprised of the switching elements Qa1 and Qa2 is so set as to move along the right side of this resonance current curve, i.e., so that, in these frequencies, the relationship of fsw>f0 may be satisfied.

On this account, standing on the above-described fundamental operation, the entire circuit operation of FIG. 9 will now be explained in detail. The switching operation of the power source circuit in the circuit construction of this FIG.

9 is performed as follows. First, using as the charging current the rectification current that is obtained by rectifying the commercially available alternating power source 100, which is closed, with the diode bridge rectification circuit 101, a rectified and smoothed voltage is generated across the both ends of the smoothing capacitor 102. Further, using this rectified and smoothed voltage as the operating power source, a power source is supplied to the oscillation drive circuit 104 through the resistor 103. And the drive pulses that are alternately generated in the oscillation drive circuit 104 are supplied to the switching elements Qa1 and Qa2, respectively.

And, with certain timing, from the oscillation drive circuit 104, for example, a positive drive pulse is supplied to the switching element Qa1 and, conversely, a negative drive pulse is supplied to the other switching element Qa2 constituting the switching circuit part 105. As a result of this, the switching element Qa1 becomes "on" and the switching element Qa2 becomes "off". Then, a positive-polarity resonance current is supplied to the serial resonance circuit comprised of the resonance capacitor 106, choke coil 107, and primary winding La1 of the insulated type converter transformer 108 via the switching element Qa1.

Further, with the next timing, from the oscillation drive circuit 104, for example, a negative drive pulse is supplied to the switching element Qa1 and, conversely, a positive drive pulse is supplied to the other switching element Qa2 constituting the switching circuit part 105. As a result of this, the switching element Qa1 immediately becomes "off" and the switching element Qa2 becomes "on". Then, a negative-polarity resonance current is supplied to the serial resonance circuit comprised of the resonance capacitor 106, choke coil 107, and primary winding La1 of the insulated type converter transformer 108 via the switching element Qa2.

By the serial resonance current obtained by this operation being repeatedly performed, the converter transformer 108 is excited. And, alternating output voltages are taken out from secondary windings La2, La3, La4, and La5 that have been made on a secondary side of the converter transformer 108. Further, to these secondary windings La2, La3, La4, and La5, there are connected rectification circuits (diodes) 109, 110, 111, and 112 and smoothing circuits (capacitors) 113, 114, 115, and 116 for taking out the direct current voltages from those alternating output voltages, respectively.

In this way, from the secondary windings La2, La3, La4, and La5 of the converter transformer 108, through the rectification circuits 109, 110, 111, and 112 and smoothing circuits 113, 114, 115, and 116, there are taken out a so-called "+B voltage" (the voltage value of that is E0) that becomes a power source voltage of, for example, a horizontal deflection circuit or a high-voltage generation circuit and the other voltages (the voltage values of that are E2, E3, and E4) that are used as the power source voltages of respective signal-operation circuits.

Also, the conversion to constant voltage of the so-called "+B voltage" that is obtained from the secondary winding La2 of the converter transformer 108 and that becomes a power source voltage of the horizontal deflection circuit or high-voltage generation circuit is performed, for example, as follows. Namely, assume, for example, that the brightness of an image displayed on the cathode ray tube rises with the result that a high-voltage load fluctuates so as to increase, or that the horizontal amplitude of the image displayed on the cathode ray tube fluctuates so as to become wide. Then, the load with respect to the +B voltage increases. As a result, the voltage value E0 of the +B voltage tends to fluctuate so as to become small.

On that account, this fluctuation of voltage is taken out by a voltage detection part comprised of resistors 117 and 118 and is error-amplified by a control circuit 119. Thereafter, the resulting voltage is sent to the oscillation drive circuit 104 for controlling and driving the frequency of the switching circuit part 105, via the photo-coupler 120 for performing the insulation of the constant-voltage control system. And, the operating frequency of the drive pulse output from the oscillation drive circuit 104 in correspondence with that voltage is so controlled as to become low. As a result, the switching frequency fsw of the switching circuit part 105 is decreased.

Here, in the above-described power source circuit, the switching frequency fsw of the switching circuit part 105 is set higher than the resonance frequency of the serial resonance circuit comprised of the resonance capacitor 106, choke coil 107, and primary winding La1 of the insulated type converter transformer 108. Accordingly, in case that the switching frequency fsw has been so controlled as to become low, this switching frequency fsw approaches to the resonance frequency f0 of the serial resonance circuit in FIG. 12. As a result, the excitation current flowing through the primary winding La1 increases, whereby the conversion to constant voltage is achieved.

Conversely, assume that the brightness of the image displayed on the cathode ray tube decreases with the result that the high-voltage load fluctuates so as to decrease, or that the horizontal amplitude of the image displayed on the cathode ray tube fluctuates so as to become narrow. Then, the voltage value E0 of the +B voltage fluctuates so as to become large. For this reason, in the same way as stated above, the control signal is sent to the oscillation drive circuit 104 through the photo-coupler 120. Thereby, the operating frequency of the drive pulse output from the oscillation drive circuit 104 in correspondence with that resulting voltage is so controlled as to become high. As a result, the switching frequency fsw of the switching circuit part 105 is increased.

Accordingly, in case that the switching frequency fsw has been so controlled as to become high, the switching frequency fsw becomes separated from the resonance frequency f0 of the serial resonance circuit in FIG. 12. As a result, the excitation current flowing through the primary winding La1 of the converter transformer 108 is suppressed, whereby the conversion to constant voltage is achieved. Also, at this time, regarding the other voltages (the voltage values of that are E2, E3, and E4) that are taken out from the secondary windings La3, La4, and La5 of the same converter transformer 108 as well, the conversion to constant voltage is achieved, substantially, by so-called "cross-regulation".

Furthermore, the +B voltage that has been obtained from the secondary winding La2 of the converter transformer 108 in that way is supplied to the horizontal deflection circuit comprised of a horizontal oscillation drive circuit 122, horizontal output circuit 123, and horizontal deflection yoke 124, via, for example, a horizontal amplitude pin-distortion correction circuit 121. Also, the +B voltage that has been obtained from the secondary winding La2 of the converter transformer 108 is also supplied as a power source of the high-voltage generation circuit constructed of a high-voltage oscillation drive circuit 125, switching circuit part 126, control circuit 127, and high-voltage transformer 128.

Next, an explanation will be given of the high-voltage generation circuit. In FIG. 9, the high-voltage generation circuit is constructed of a separately-excited type of current resonance type converter. And, the drain of a switching element Qa3 is connected to the +B voltage and the source of a switching element Qa4 is grounded so that the two switching elements Qa3 and Qa4 constituting the switching circuit part 126 may construct a half-bridge circuit. Also, between the source and the drain of the switching elements Qa3 and Qa4 there are respectively connected damper diodes Da3 and Da4.

Further, to a point of connection between the source of the switching element Qa3 and the drain of the switching element Qa4 there are connected in series a resonance capacitor 129, choke coil 130, and high-voltage transformer 128 such as a flyback transformer (FBT). And, to the switching elements Qa3 and Qa4 there are supplied from the high-voltage oscillation drive circuit 125 rectangular drive pulses that have different polarities and that are intended to alternately make these switching elements "on" and "off" in units of a half period.

Namely, the switching operation of the high-voltage generation circuit that has the above-described construction is performed as follows. First, when a power source is supplied from the +B voltage to the high-voltage oscillation drive circuit 125 by way of the resistor 131 whereby the +B voltage is supplied to this high-voltage generation circuit, a positive drive pulse is supplied from the high-voltage oscillation drive circuit 125 to the switching element Qa3. Resultantly, the switching element Qa3 becomes "on". And, via the switching element Qa3, a positive resonance current is supplied to the resonance capacitor 129 and to a primary winding Lb0 of the high-voltage transformer 128.

Next, a negative drive pulse is supplied to the switching element Qa3 and, conversely to this, a positive drive pulse is supplied to the switching element Qa4. Resultantly, the switching element Qa3 immediately becomes "off" and the switching element Qa4 becomes "on". Resultantly, via the switching element Qa4, a negative resonance current is supplied to the resonance capacitor 129 and to the primary winding Lb0 of the high-voltage transformer 128. By this operation being repeatedly performed, the serial resonance current excites the high-voltage transformer 128. Thereby, alternating output voltages are taken out from high-voltage windings Lb1 to Lb9 that have been made on a secondary side of the high-voltage transformer 128.

Further, for performing full-wave rectification with respect to the positive and negative alternating voltages, regarding the windings Lb1 to Lb9, the windings Lb6 to Lb9 and diodes Db6 to Db9 are connected in series to each other. And, the windings Lb1 to Lb4 have diodes Da1 to Db5 respectively connected in series thereto so as to have an opposite polarity to that of the windings Lb6 to Lb9. Thereafter, the both groups of winding are connected to each other. Also, to this portion of connection there is connected the winding Lb5 one end of that is made open. And, equivalently providing a smoothing capacitor, the rectified voltages obtained from the windings Lb1 to Lb4 and those obtained from the windings Lb6 to Lb9 are serially accumulated up. It is thereby arranged that a high-voltage output voltage EHT be obtained through the use of an output capacitor 132.

And, the conversion to constant voltage of the high-voltage output voltage EHT obtained from the high-voltage windings Lb1 to Lb9 is performed in the same way as in the case of the equivalent circuit of FIG. 10 for example as follows. Namely, in this high-voltage generation circuit, under the assumption that f01 represents the resonance frequency of a serial resonance circuit constructed of the serial resonance capacitor 129, choke coil 130, and primary winding Lb0 of the high-voltage transformer 128, the following setting is done beforehand. Namely, the switching frequency fsw1 of a switching circuit constructed of the half-bridge converter is set higher than the resonance frequency f01.

On this account, assuming that the brightness of the image displayed on, for example, a cathode ray tube increases with the result that the high-voltage load fluctuates so as to increase, the high-voltage output voltage EHT fluctuates so as to decrease. This voltage fluctuation is taken out by a voltage detection circuit constructed of resistors 133 and 134. And a control signal obtained through the operation of the control circuit 127 is sent to the high-voltage oscillation drive circuit 125. Thereby, the operating frequency of the drive pulse that is output from the high-voltage oscillation drive circuit 125 in correspondence with that resulting voltage is so controlled as to become low. As a result, assuming that fsw1 represents the switching frequency of the switching elements Qa3 and Qa4, this switching frequency fsw1 decreases.

Conversely, assuming that the brightness of the image displayed on the cathode ray tube decreases with the result that the high-voltage load fluctuates so as to decrease, the high-voltage output voltage EHT fluctuates so as to increase. This voltage fluctuation is taken out by the voltage detection circuit constructed of the resistors 133 and 134. And a control signal obtained through the operation of the control circuit 127 is sent to the oscillation drive circuit 125. Thereby, the operating frequency of the drive pulse that is output from the high-voltage oscillation drive circuit 125 in correspondence with that resulting voltage is so controlled as to become high. As a result, the switching frequency fsw1 of the switching elements Qa3 and Qa4 increases.

Accordingly, in the setting of the previously stated high-voltage generation circuit, when the brightness of the image displayed on the cathode ray tube increases and in consequence the high-voltage load increases, the high-voltage output voltage EHT fluctuates so as to become low. For this reason, the switching frequency fsw1 is so controlled as to become low. However, at this time, the switching frequency fsw1 approaches the resonance frequency f01 of the serial resonance circuit. Resultantly, the excitation current flowing through the primary winding Lb0 increases, whereby the conversion to constant voltage is achieved.

Conversely, when the brightness of the image displayed on the cathode ray tube decreases and in consequence the high-voltage load fluctuates so as to decrease, the high-voltage output voltage EHT fluctuates so as to increase. For this reason, the switching frequency fsw1 is so controlled as to become high, with the result that the switching frequency fsw1 goes away from the resonance frequency f01 of the serial resonance circuit. Resultantly, the excitation current flowing through the primary winding Lb0 is suppressed with the result that the conversion to constant voltage is achieved.

Further, the high-voltage transformer 128 has provided therein a secondary winding Lc1 for obtaining a voltage E1 used as the detection voltage for use for a protection circuit in addition to the primary winding Lb0, to which the excitation current is supplied, and the high-voltage windings Lb1 to Lb9 for obtaining the high-level output voltage EHT for supplying an anode voltage to the cathode ray tube, as the secondary winding. And, the alternating output voltage taken out from the secondary winding Lc1 of this high-voltage transformer 128 is supplied to the smoothing capacitor 135 through the rectification diode Dc1. Thereby, the voltage E1, which is used as the detection voltage for use for the protection circuit, is taken out.

Further, in FIG. 13, illustration is made, as a block diagram, of the entire construction of the above-described conventional apparatus that includes the insulated-type switching power source circuit, horizontal deflection circuit, and high-voltage generation circuit. In this FIG. 13, the commercially available alternating power source is rectified in an AC rectification/smoothing circuit 301. Using the rectified current obtained by that rectification as the charging current, a rectified/smoothed voltage is obtained across the ends of the smoothing capacitor. This rectified/smoothed voltage is used as the operating power source. And, a converter circuit 303 is made to perform the switching operation with the use of a drive pulse obtained from an oscillation drive circuit 302. A converter transformer 304 is thereby excited and, from this converter transformer 304, an output voltage is taken out.

Using the thus-taken-out output voltage, a horizontal output circuit 306 is made to perform the switching operation with the use of a drive pulse obtained from the horizontal oscillation drive circuit 305. Thereby, a deflection current is supplied to a horizontal deflection yoke 307. Along with this, an output voltage from the converter transformer 304 is supplied to a control circuit 308, and a control signal from this control circuit 308 is supplied to the oscillation drive circuit 302. By doing so, the output voltage from the converter transformer 304 is stabilized.

Also, using an output voltage that is taken out from the converter transformer 304, a high-voltage output circuit 310 is made to perform the switching operation with the use of a drive pulse obtained from a high-voltage oscillation drive circuit 309. Thereby, a high-voltage transformer 311 is excited to cause the generation of a high voltage from this high-voltage transformer 311. Thereby, a high voltage is supplied to the anode of a cathode ray tube 312. Along with this, the output voltage of the high-voltage transformer 311 is supplied to a control circuit 313, a control signal from that is supplied to the high-voltage oscillation drive circuit 309. Thereby, the output voltage from the high-voltage transformer 311 is stabilized.

In this way, the +B voltage and the high-voltage and further other voltages are formed. However, in the above-described conventional switching power source apparatus, there are problematic points to be improved from the economical point of view as well as from the viewpoint of the effective utilization of the energy resources. Namely, a first problematic point is the loss of electric power in the switching circuit part and a second problematic point is the efficiency of conversion in the switching converter output transformer. These two problematic points will hereafter be explained.

Namely, this switching power source apparatus, as a first problem, has a circuit construction that is equipped with power source circuit parts having the function of providing a plurality of constant-level output voltages. In addition, the circuit construction is equipped with a separate high-voltage generation circuit part for obtaining a highly precise high-voltage load characteristic. For this reason, it is unavoidable that the switching circuit part is made up into a two-system construction. Here, separately providing the high-voltage generation circuit in such a way is surely very advantageous in terms of the characteristics. However, resultantly, there results the drawback that the circuit construction becomes complex and the problem that the loss of electric power of the switching circuit part increases.

Also, this switching power source apparatus, as a second problem, is equipped, in its power source circuit part, with an insulated type converter transformer for insulating it from the grounding earth. And it is also equipped, in its high-voltage generation circuit part, with a non-insulated type high-voltage transformer such as a flyback transformer. For this reason, the output converter transformer cannot but be made up into a construction of its being doubly equipped. Resultantly, in a construction wherein a high-level output voltage is taken out using switching means for performing the switching operation with the rectified/smoothed voltage obtained from a commercially available alternating power source being used as the operating power source, the direct current to direct current conversion efficiency becomes inferior. Resultantly, this apparatus has a point of problem in achieving the saving of the power.

SUMMARY OF THE INVENTION

The invention of this application has been made in view of the above-described problems, and the points of problem to be solved are that, in the above-described conventional switching power source apparatus, first, there was the problem of the power loss of the switching circuit part and, second, there was the problem of the conversion efficiency of the switching converter output transformer part.

For the above-described reasons, in the present invention, it is arranged to adopt means for decreasing the loss of electric power of the switching power source part and improving the conversion efficiency. In other words, it is arranged to adopt control means that causes the operation of the switching output circuit for performing its switching operation with a small loss of power, and that is connected to the switching output circuit for performing its switching operation to thereby perform the switching frequency control and the inductance control able to be performed with a small loss of power. According to this construction, it is possible to provide a switching power source apparatus that can be put to practical use.

BRIEF DESCRIPTION OF THE DRAWINGS

FIGS. 11A to 11C are waveform views taken for explanation thereof;

DESCRIPTION OF THE PREFERRED EMBODIMENTS

The switching power source apparatus of the invention is equipped with switching means for performing the switching operation by using a direct current voltage as its operating power source, oscillation drive means that is connected to the switching means to thereby make the switching operation performed with a given value of frequency, a primary winding that is driven by the switching operation of the switching means under resonance state, first control means that controls the oscillation frequency of the oscillation drive means by the use of a control signal obtained from the output of a first rectification circuit that is connected to a first secondary winding with respect to the primary winding, a saturable reactor that is connected to a second secondary winding with respect to the primary winding, and second control means for controlling the inductance of the saturable reactor by the use of a control signal obtained from the output of a second rectification circuit connected to the saturable reactor.

Also, the switching power source apparatus of the invention is equipped with switching means for performing the switching operation by using a direct current voltage as its operating power source, oscillation drive means that is connected to the switching means to thereby make the switching operation performed with a given value of frequency, a first primary winding that is resonance driven by the switching operation of the switching means to constitute a first converter transformer, first control means that controls the oscillation frequency of the oscillation drive means by the use of a control signal obtained from the output of a first rectification circuit that is connected to a first secondary winding with respect to the first primary winding, a second primary winding that is provided in parallel with the first primary winding to constitute a second converter transformer, a saturable reactor that is connected in series with a second primary winding, and second control means for controlling the inductance of the saturable reactor by the use of a control signal obtained from the output of a second rectification circuit connected to a second secondary winding with respect to the second primary winding.

Figure 1:
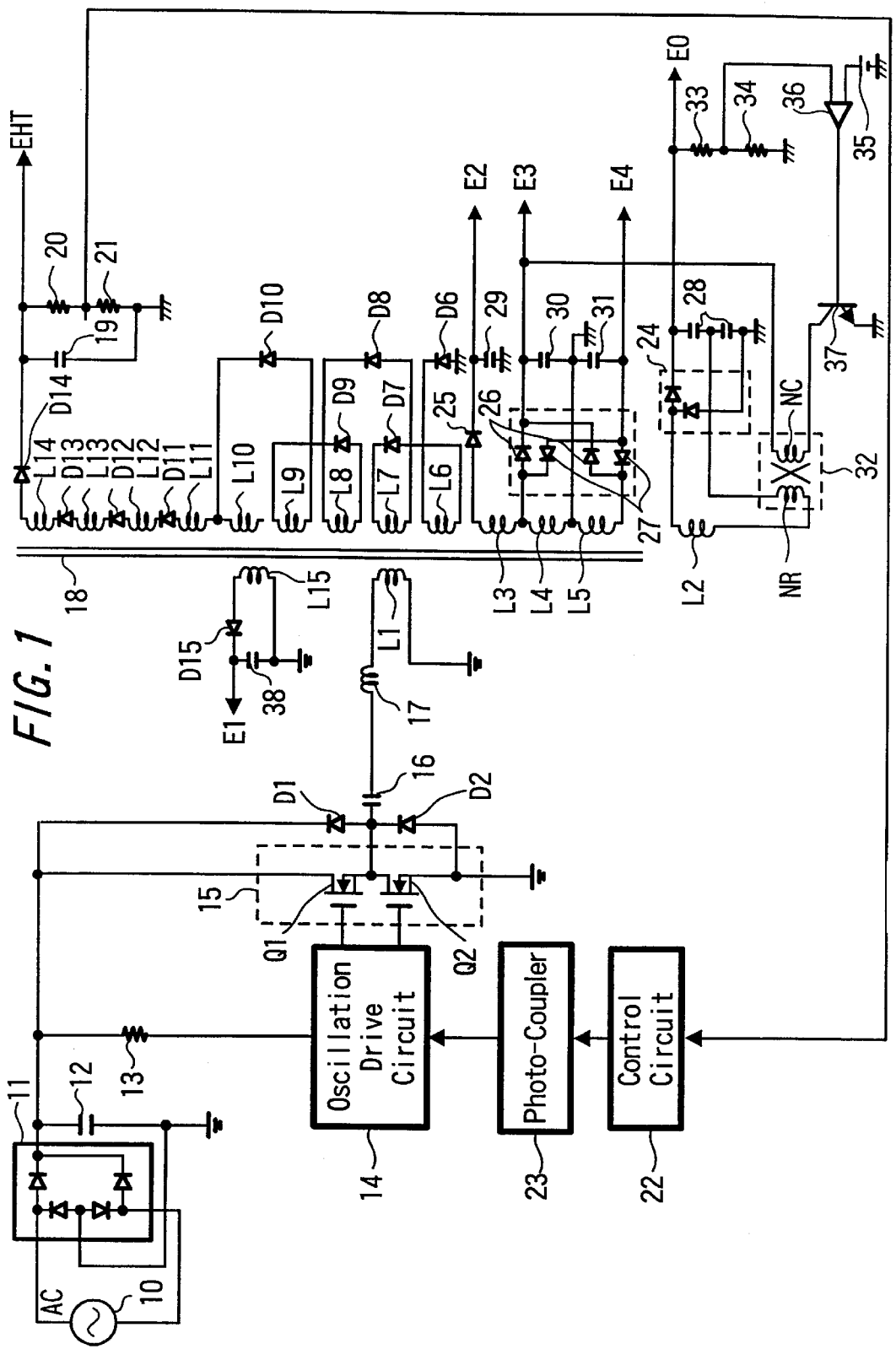
FIG. 1 is a constructional view illustrating a first embodiment of a switching power source apparatus according to the present invention.

The invention will now be explained with reference to the drawings. FIG. 1 is a block diagram illustrating the construction of a first embodiment of the switching power source apparatus to that the invention is applied.

In FIG. 1, a commercially available alternating power source (AC) 10 is connected to a smoothing capacitor 12 through a diode bridge rectification circuit 11. A negative-polarity end of the capacitor 12 is grounded and a positive-polarity end thereof is connected to an oscillation drive circuit 14 through a resistor 13. Simultaneously, the positive-polarity end of the capacitor 12 is grounded through a switching circuit part 15 consisting of, for example, a serial circuit comprised of switching elements Q1 and Q2 such as a power MOS-FET transistor. And, these switching elements Q1 and Q2 are driven so as to become alternately conductive at a prescribed frequency by the oscillation drive circuit 14.

Further, this switching circuit part 15 constitutes a half-bridge circuit. The positive-polarity end of the capacitor 12 is connected to the drain of the switching element Q1 and the source of the switching element Q2 is grounded. Also, to the switching elements Q1 and Q2 there are respectively connected in parallel damper diodes D1 and D2. And a point of connection between the source of the switching element Q1 and the drain of the switching element Q2 is grounded through a resonance capacitor 16, choke coil 17, and primary winding L1 of a converter transformer 18.

As a result of this, into the primary winding L1 of the converter transformer 18 there is made to flow a resonance current the polarity of that is inverted according to the oscillation frequency of the oscillation drive circuit 14. Thereby, a so-called "separately-excited type" of current resonance type of converter power source circuit is constructed. The switching operation of the power source circuit as constructed above is as follows. First, upon closure of the commercially available alternating power source 10, a positive drive pulse is supplied to the switching element Q1 from the oscillation drive circuit 14 and is thereby made "on". Then, a positive resonance current is supplied to the resonance capacitor 16, choke coil 17, and primary winding L1 made on a primary side of the converter transformer 18 via the switching element Q1.

Next, a negative drive pulse is supplied to the switching element Q1 and, conversely thereto, a positive drive pulse is supplied to the switching element Q2. Thereby, the switching element Q1 is immediately made "off" and the switching element Q2 is made "on". As a result of this, a negative-polarity resonance current is supplied to the resonance capacitor 16, choke coil 17, and primary winding L1 of the converter transformer 18 via the switching element Q2. This operation is repeatedly performed. Thereby, the converter transformer 18 is excited by the serial resonance current, with the result that an alternating output voltage is taken out from each of the respective windings made on the secondary side of the transformer 18.

Further, the converter transformer 18 is made up into an insulated type construction. And, on the primary side thereof, as stated previously, there is provided the primary winding L1 to that the excitation current is supplied. On a secondary side of the converter transformer 18, there are provided a secondary winding L2 for obtaining a +B voltage that is used mainly as the power source voltage of a horizontal deflection circuit, secondary windings L3 to L5 for obtaining the other voltages (the voltage values E2 to E4), high-voltage windings L6 to L14, serving as secondary windings, that have provided therein rectification circuits intended to obtain a high-voltage output voltage EHT for supply of an anode voltage of the cathode ray tube, and a secondary winding L15 for obtaining a voltage E1 used as a detection voltage for use for a protection circuit.

Here, for performing full-wave rectification with respect to the positive and negative alternating voltages, the high-voltage windings L6 to L14 are constructed as follows. The windings L11 to L14 and diodes D11 to D14 are connected in series to one another while the windings L6 to L9 and diodes D6 to D10 are connected in series to one another so that the windings L6 to L9 may have an opposite polarity to that of the windings L11 to L14. Thereafter, the both groups of winding are connected to each other. Also, to this point of connection there is connected a winding L10 one end of that is made open. Thereby, equivalently providing a smoothing capacitor, the rectified voltages obtained from the windings L6 to L9 and the windings L11 to L14 are serially accumulated up to thereby obtain the high-voltage output voltage EHT via the output capacitor 19.

The conversion to constant voltage of the high-level output voltage EHT obtained from those high-voltage windings is performed as follows. Assume, for example, that the input voltage value of the commercially available alternating power source 10 has decreased, or that the brightness of the image displayed on the cathode ray tube has increased and resultantly the high-voltage load has fluctuated so as to increase. In this case, the high-level output voltage EHT fluctuates so as to decrease. Thereupon, this fluctuation of voltage is taken out by a voltage detection circuit constructed of resistors 20 and 21. Then, a control signal obtained from a control circuit 22 is supplied to the oscillation drive circuit 14 through a photo-coupler 23 for insulating the conversion-to-constant-voltage system.

Control is so performed that the operating frequency of the drive pulse output from the oscillation drive circuit 14 may decrease, in correspondence with that control signal. Resultantly, under the assumption that fsw2 represents the switching frequency of the switching elements Q1, Q2 constituting the switching circuit part 15, this switching frequency fsw2 decreases. Here, in the above-described circuit, the following setting is made beforehand. Namely, the switching frequency fsw2 of the switching circuit part 15 constructed of a half-bridge type converter is set higher than the resonance frequency of the serial resonance circuit constructed of the resonance capacitor 16, choke coil 17, and primary winding L1 of the converter transformer 18.

For this reason, in the above-described case, when the brightness of the image displayed on the cathode ray tube increases and resultantly the high-voltage load increases, the high-level output voltage EHT fluctuates so as to decrease. Resultantly, control is so performed that the switching frequency fsw2 may decrease. However, assuming that f02 represents the resonance frequency of the serial resonance circuit, at that time, it results that the switching frequency fsw2 approaches to this resonance frequency f02. Resultantly, the excitation current flowing through the primary winding L1 of the converter transformer 18 increases with the result that the conversion to constant voltage of the high-level output voltage EHT obtained from the high-voltage windings is achieved.

Conversely, assume that the commercially available alternating input voltage has increased, or that the brightness of the image displayed on the cathode ray tube has decreased and resultantly the high-voltage load has fluctuated so as to decrease. In this case, the high-level output voltage EHT fluctuates so as to increase. And, the control signal resulting from this fluctuation of voltage is sent to the oscillation drive circuit 14 through the photo-coupler 23 as stated above. And, control is so performed that the operating frequency of the drive pulse output from the oscillation drive circuit 14 may increase, in correspondence with the fluctuated voltage. Resultantly, the switching frequency fsw2 of the switching elements Q1, Q2 increases.

Namely, in case that the brightness of the image displayed on the cathode ray tube has decreased and resultantly the high-voltage load has fluctuated so as to decrease, the high-level output voltage EHT fluctuates so as to increase. Therefore, control is so performed that the switching frequency fsw2 may increase, with the result that the switching frequency fsw2 goes away from the resonance frequency f02 of the serial resonance circuit. As a result, the excitation current flowing through the primary winding L1 of the converter transformer 18 is suppressed. Thereby, the conversion to constant voltage of the high-level output voltage EHT obtained from the high-voltage windings is achieved.

Further, to the secondary windings L2, L3, L4, and L5 there are connected rectification circuits (diodes) 24, 25, 26, and 27 for taking out the direct current voltage from their respective alternating output voltages and smoothing circuits (capacitors) 28, 29, 30, and 31. In this way, from the secondary windings L2, L3, L4, and L5 of the converter transformer 18 there are taken out the so-called +B voltage (the voltage value E0) becoming the power source voltage of the horizontal deflection circuit or high-voltage generation circuit and the other voltages (the voltage values E2, E3, and E4) used as the power source voltages of the respective signal-operation circuits, respectively.

The conversion to constant voltage of the +B voltage (the voltage value E0) that is taken out from the secondary winding L2 of the converter transformer 18 is performed as follows. Namely, to the secondary winding L2 of the converter transformer 18 there is connected in series a saturable reactor 32 as means for performing the conversion to constant voltage control. And, there is adopted a method of controlling the +B voltage taken out from the secondary winding L2 by controlling the inductance of this saturable reactor 32.

Figure 2:
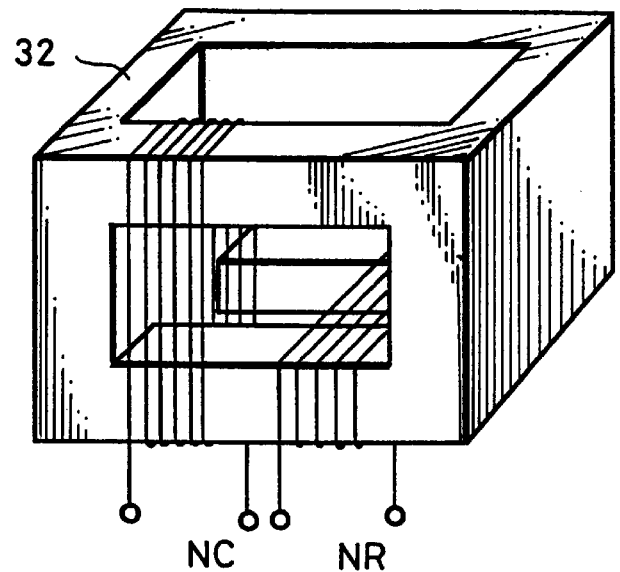
FIG. 2 is a view taken for explaining a main part thereof.

To this end, the saturable reactor 32 is constructed of an orthogonal-crossing type saturable reactor having a control winding NC and a controlled winding NR, such as that illustrated in FIG. 2. And, the controlled winding NR of the saturable reactor 32 is connected in series to the secondary winding L2 of the converter transformer 18 while a control current, which corresponds to the control signal obtained by detection of the fluctuation of the +B voltage, is caused to flow into the control winding NC. Thereby, the inductance of the controlled winding NR connected in series to the secondary winding L2 is controlled.

Namely, in case that in FIG. 1 the output voltage E0 has, for example, increased, this output voltage E0 is detected by detection resistors 33, 34. Then, when the detected voltage more increases than a reference voltage 35, the output of an inversion comparison amplifier 36 decreases with the result that the collector current of a control transistor 37 decreases. This collector current acts as the control current to thereby control the inductance of the controlled winding NR of the saturable reactor 32. In this case, the collector current acts so that the inductance of the controlled winding NR may be increased. Resultantly, the output voltage E0 is suppressed by such control of the inductance.

Conversely, in case that the output voltage E0 has decreased, the detected voltage of this output voltage E0 more decreases than the reference voltage 35. Therefore, the output of the inversion comparison amplifier 36 increases. As a result of this, the collector current of the control transistor 37 increases. This collector current acts as the control current to thereby control the inductance of the controlled winding NR of the saturable reactor 32. In this case, the collector current acts so that the inductance of the controlled winding NR may be decreased. Resultantly, the output voltage E0 is increased through such control of the inductance. Thereby, the conversion to constant voltage of the +B voltage taken out from the secondary winding L2 is achieved.

In this way, the conversion to constant voltage of the high-level output voltage EHT and the +B voltage (the voltage value E0) is performed. Also, at this time, the other voltages (the voltage values E2, E3, and E4) taken out from the secondary windings L3, L4, and L5 of the converter transformer 18 are also similarly subjected substantially to conversion to the constant voltage by the so-called "cross-regulation". Further, the alternating output voltage taken out from the secondary winding L15 of the converter transformer 18 is supplied to the smoothing capacitor 38 through the rectification diode D15. Thereby, the voltage E1 that is used as the detection voltage for the protection circuit is taken out.

Figure 3:
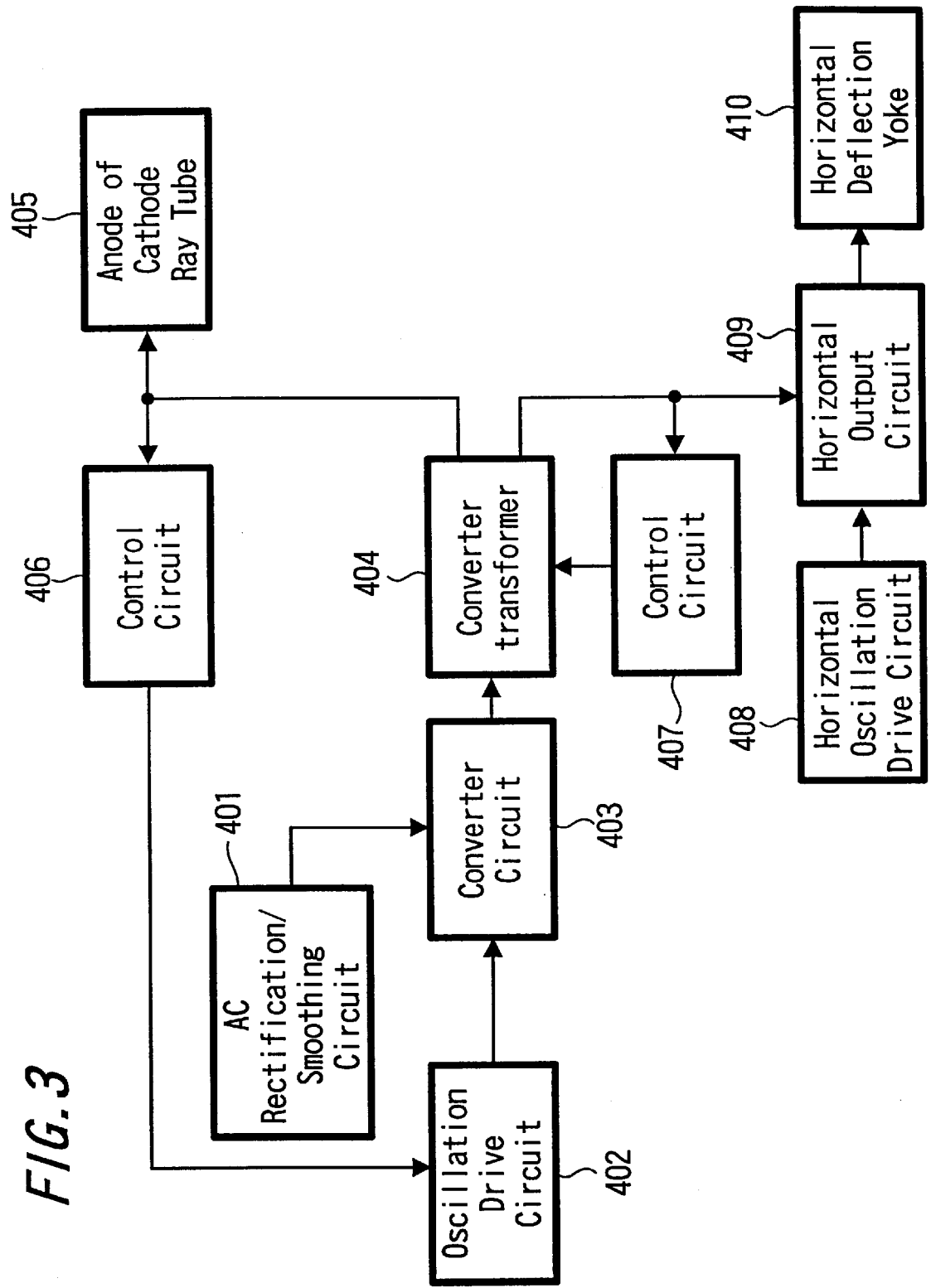
FIG. 3 is a block diagram illustrating the entire construction thereof.

Further, in FIG. 3, illustration is made, as a block diagram, of the construction of the entire switching power source apparatus that includes the above-described insulated type switching power source circuit, horizontal deflection circuit, and high-voltage generation circuit. In this FIG. 3, a rectified current is obtained by rectifying the commercially available alternating power source with the use of an AC rectification/smoothing circuit 401. Using this rectified current as the charging current, a rectified and smoothed voltage is obtained across the smoothing capacitor. Using this rectified and smoothed voltage as the operating power source, and using a drive pulse obtained from an oscillation drive circuit 402, a converter circuit 403 performs its switching operation to thereby excite a converter transformer 404.

As a result of this, the high-level output voltage EHT, +B voltage, and other output voltages are taken out from the converter transformer 404. And, the high voltage that has been generated from the converter transformer 404 is supplied to the anode of a cathode ray tube 405 and also supplied to a control circuit 406. Thereby, a control signal from this control circuit 406 is supplied to the oscillation drive circuit 402, whereby the high-level output voltage EHT from the converter transformer 404 is stabilized.

Further, the output voltage from the converter transformer 404 is supplied to a control circuit 407 including the above-described saturable reactor 32, whereby a control signal from this control circuit 407 is supplied to the converter transformer 404. Thereby, the output voltage therefrom is stabilized. Using the thus-stabilized output voltage, and using a drive pulse obtained from a horizontal oscillation drive circuit 408, a horizontal output circuit 409 performs its switching operation. Resultantly, a deflection current is supplied to a horizontal deflection yoke 410.

Accordingly, in this switching power source apparatus, it is arranged to adopt means for decreasing the loss of power of the switching power source part and improving the conversion efficiency. In other words, it is arranged to adopt control means that causes the switching output circuit performing its switching to operate with a small loss of power, and that is connected to the switching output circuit performing its switching operation to thereby perform the switching frequency control and the inductance control able to be performed with a. small loss of power. According to this construction, it is possible to provide a switching power source apparatus that can be put to practical use.

As a result of this, while the conventional switching power source apparatus has, as a first drawback, the problem of the loss of electric power in the switching circuit part and, as a second drawback, the problem of the conversion efficiency in the switching converter output transformer part, the invention enables easily solving these problems.

Next, a second embodiment of the present invention will be explained with reference to FIG. 4. It is to be noted that, in this second embodiment, the converter transformer is constructed of a plurality of insulated type converter transformers.

Figure 4:
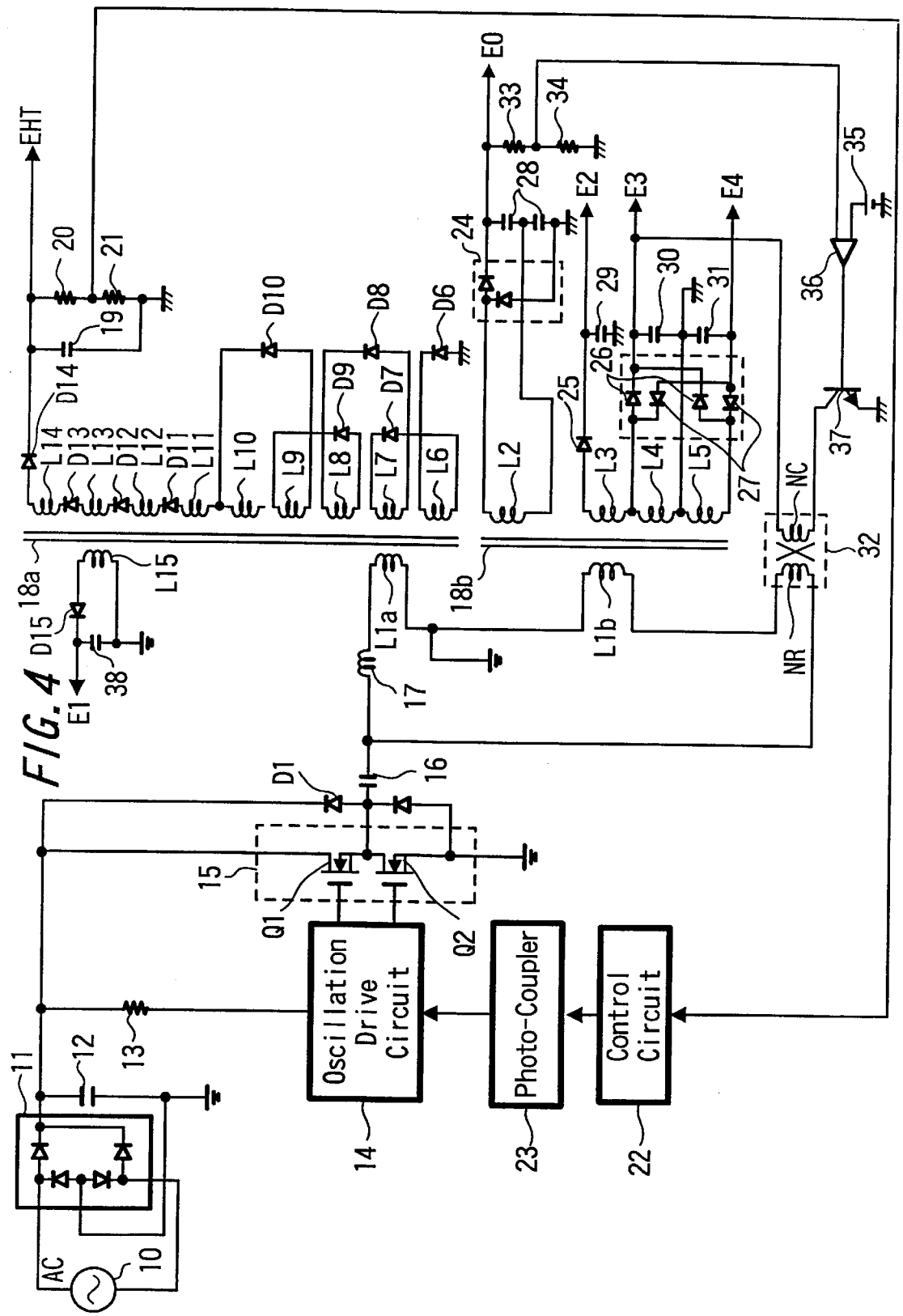
FIG. 4 is a constructional view illustrating a second embodiment of the switching power source apparatus according to the present invention.

Namely, in FIG. 4, converter transformers 18a, 18b each constitute part of the above-described converter transformer 18 illustrated in FIG. 1. And, a first converter transformer 18a is constructed of a primary winding L1a, to which the excitation current is supplied, high-voltage windings L6 to L14 that are made as secondary windings and intended to obtain a high-level output voltage EHT for supplying, for example, an anode voltage to a cathode ray tube, and a secondary winding L15 for obtaining a voltage E1 that is used as a detection voltage for use for the protection circuit.

Also, a second converter transformer 18b is constructed of a primary winding L1b, to which the excitation current is supplied, and secondary windings L2, L3, L4, and L5 mainly for obtaining a +B voltage (the voltage value E0) used as a power source voltage of the horizontal deflection circuit and the other voltages (the voltage values E2, E3, and E4). In this embodiment, to the primary winding L1b of the second converter transformer 18b is connected in series a saturable reactor 32 for performing its conversion-to-constant-voltage control. The remaining part is constructed as in the case of FIG. 1, and the portions corresponding to those of FIG. 1 are denoted by the same reference numerals.

And, in this FIG. 4, one end of the resonance capacitor 16 is connected in series to the point of connection between the source of the switching element Q1 and the drain of the switching element Q2 so that the two switching elements Q1 and Q2 constituting the switching circuit part 15 may construct the half-bridge circuit. The other end of this resonance capacitor 16 has connected thereto via the choke coil 17 one end of the primary winding L1a of the first converter transformer 18a, and the other end of which is connected to the earth.

Also, to the other end of the resonance capacitor 16 there is connected the saturable reactor 32, to which there is connected one end of the primary winding L1b of the second converter transformer 18b, the other end of which is grounded. As a result of this, the choke coil 17 and the primary winding L1a of the first converter transformer 18a, and the saturable reactor 32 and the primary winding L1b of the second converter transformer 18b form a parallel circuit.

On this account, the switching operation of the above-constructed power source circuit is performed as follows. First, upon closure of the commercially available alternating power source 10, a positive drive pulse is supplied from the oscillation drive circuit 14 to the switching element Q1, thereby this switching element Q1 becomes "on". Resultantly, to the resonance capacitor 16 and the primary windings L1a and L1b of the first and second converter transformers 18a and 18b there is supplied via the switching element Q1 a positive-polarity resonance current that corresponds to the inductance value of a composite inductor forming the serial resonance circuit.

Next, a negative drive pulse and a positive drive pulse are respectively supplied to the switching element Q1 and the switching element Q2. Thereby, the switching element Q1 is made "off" and the switching element Q2 is made "on". As a result, conversely to the above-described operation, a negative-polarity resonance current is supplied to the resonance capacitor 16 and the primary windings L1a and L1b of the first and second converter transformers 18a and 18b via the switching element Q2. Through the repeated performance of this operation, the output transformer is excited through the positive/negative-polarity resonance current. Thereby, alternating output voltages are taken out from the secondary windings of the first and second converter transformers 18a and 18b.

And, in this apparatus, the conversion to constant voltage of the high-level output voltage EHT taken out from the secondary windings L6 to L14 of the first converter transformer 18a is performed as follows. Assume, for example, that the commercially available alternating voltage 10 has decreased, or that the brightness of the image displayed on the cathode ray tube has increased and resultantly the high-voltage load has fluctuated so as to increase. In this case, the high-level output voltage EHT fluctuates so as to decrease.

Thereupon, this fluctuation of voltage is taken out by a voltage detection circuit constructed of resistors 20 and 21. Then, the control signal obtained from the control circuit 22 is supplied to the oscillation drive circuit 14 through the photo-coupler 23 for insulating the conversion-to-constant-voltage control system. Control is so performed that the operating frequency of the drive pulse output from the oscillation drive circuit 14 may decrease, in correspondence with this voltage. Resultantly, under the assumption that fsw3 represents the switching frequency of the switching elements Q1, Q2, this switching frequency fsw3 decreases.

Conversely, assume that the commercially available alternating input voltage 10 has increased, or that the brightness of the image displayed on the cathode ray tube has decreased and resultantly the high-voltage load has fluctuated so as to decrease. In this case, the high-level output voltage EHT fluctuates so as to increase. And, as stated previously, this fluctuation of voltage is sent to the oscillation drive circuit 14 through the photo-coupler 23. And, control is so performed that the operating frequency of the drive pulse output from the oscillation drive circuit 14 may increase, in correspondence with the voltage. Resultantly, the switching frequency fsw3 of the switching elements Q1, Q2 increases.

Here, in the above-described power source circuit, the following setting is made beforehand. Namely, the switching frequency fsw3 of the switching circuit part 15 constructed of a half-bridge type converter is set at all times higher than the resonance frequency f03 of the resonance circuit constructed of the resonance capacitor 16, choke coil 17, and primary winding L1a of the first converter transformer 18a, saturable reactor 32, and primary winding L1b of the second converter transformer 18b.

For this reason, in this circuit, when the brightness of the image displayed on the cathode ray tube increases and resultantly the high-voltage load has fluctuated so as to increase, the high-level output voltage EHT fluctuates so as to decrease. Resultantly, control is so performed that the switching frequency fsw3 may decrease. Resultantly, the switching frequency fsw3 approaches to the resonance frequency f03 of the serial resonance circuit. Resultantly, the excitation current flowing through the primary winding L1a increases with the result that the conversion to constant voltage is achieved.

Conversely, assume that the brightness of the image displayed on the cathode ray tube has decreased and resultantly the high-voltage load has fluctuated so as to decrease. Then, the high-level output voltage EHT fluctuates so as to increase. Therefore, control is so performed that the switching frequency fsw3 may increase, with the result that the switching frequency fsw3 goes away from the resonance frequency f03 of the serial resonance circuit. Resultantly, the excitation current flowing through the primary winding L1a is suppressed, thereby the conversion to constant voltage is achieved.

In contrast to this, the conversion to constant voltage of the output voltage E0 taken out from the secondary winding L2 of the secondary converter transformer 18b is performed as follows. Namely, the second converter transformer 18b is constructed of the primary winding L1b to that the excitation current is supplied, the secondary winding L2 for obtaining the +B voltage used as the power source voltage of, for example, the horizontal deflection circuit, and the secondary windings L3, L4, and L5 for obtaining the other voltages. On the other hand, to the primary winding L1b of the second converter transformer 18b there is connected the saturable reactor 32 for performing its conversion-to-constant-voltage control.

Here, the saturable reactor 32 is constructed of the control winding NC and the controlled winding NR. The saturable reactor 32 is constructed into such an insulated form wherein the control winding NC is made at a sufficient spatial distance from the controlled winding NR. And, to the primary winding L1b of the second converter transformer 18b there is connected in series this controlled winding NR. Into the control winding NC there is made to flow the control current that is in corresponding relationship to the control signal and depends upon the fluctuation of the output voltage E0 taken out from the secondary winding L2. As a result of this, control is performed of the inductance of the controlled winding NR.

And, in this apparatus, the output voltage E0 taken out from the secondary winding L2 is subjected to conversion to the constant voltage through the performance of the following operation. Namely, in case that the output voltage E0 has, for example, increased, this output voltage E0 is detected by the detection resistors 33, 34. Then, when the detected voltage more increases than the reference voltage 35, the output of the inversion comparison amplifier 36 decreases with the result that the collector current of the control transistor 37 decreases. This collector current acts as the control current to thereby control the inductance of the controlled winding NR of the saturable reactor 32. In this case, the collector current acts so that the inductance of the controlled winding NR may be increased.

Resultantly, through the control of the inductance, the excitation current flowing through the primary winding L1b of the second converter transformer 18b is suppressed. Thereby, the output voltage E0 is converted to a constant voltage. Namely, in this case, when the output voltage E0 increases, the output of the inversion comparison amplifier 36 decreases with the result that the collector current of the control transistor 37 decreases. Thereby, the inductance of the controlled winding NR of the saturable reactor 32 increases. Resultantly, the excitation current flowing through the primary winding L1b of the second converter transformer 18b is suppressed through the control of the inductance. After all, the output voltage E0 is converted to a constant voltage.

Conversely, in case that the output voltage E0 has decreased, the detected voltage that is detected by the resistors 33, 34 more decreases than the reference voltage 35. Therefore, the output of the inversion comparison amplifier 36 increases. As a result of this, the collector current of the control transistor 37 increases. Thereupon, this collector current acts to control the inductance of the controlled winding NR of the saturable reactor 32 so as to decrease this inductance. As a result, the excitation current flowing through the primary winding L1b of the second converter transformer 18b is increased through the control of the inductance. Thereby, the conversion to constant voltage of the output voltage E0 is achieved. It is to be noted that the remaining operation is performed in the same way as in the above-described first embodiment.

Accordingly, in this apparatus, also, it is arranged to adopt means for decreasing the loss of power of the switching power source part and improving the conversion efficiency. In other words, it is arranged to adopt control means that causes the operation of the switching output circuit for performing its switching operation with a small loss of power, and that is connected to the switching output circuit for performing its switching operation to thereby perform the switching frequency control and the inductance control able to be performed with a small loss of power. According to this construction, it is possible to provide a switching power source apparatus that can be put to practical use.

As a result of this, while the conventional switching power source apparatus has, as a first drawback, the problem of the loss of power in the switching circuit part and, as a second drawback, the problem of the conversion efficiency in the switching converter output transformer part, the invention enables easily solving these problems.

Further, a third embodiment of the present invention will be explained with reference to FIG. 5. It is to be noted that, in this embodiment, the oscillation drive circuit part is made up into a self-excited type construction.

Figure 5:
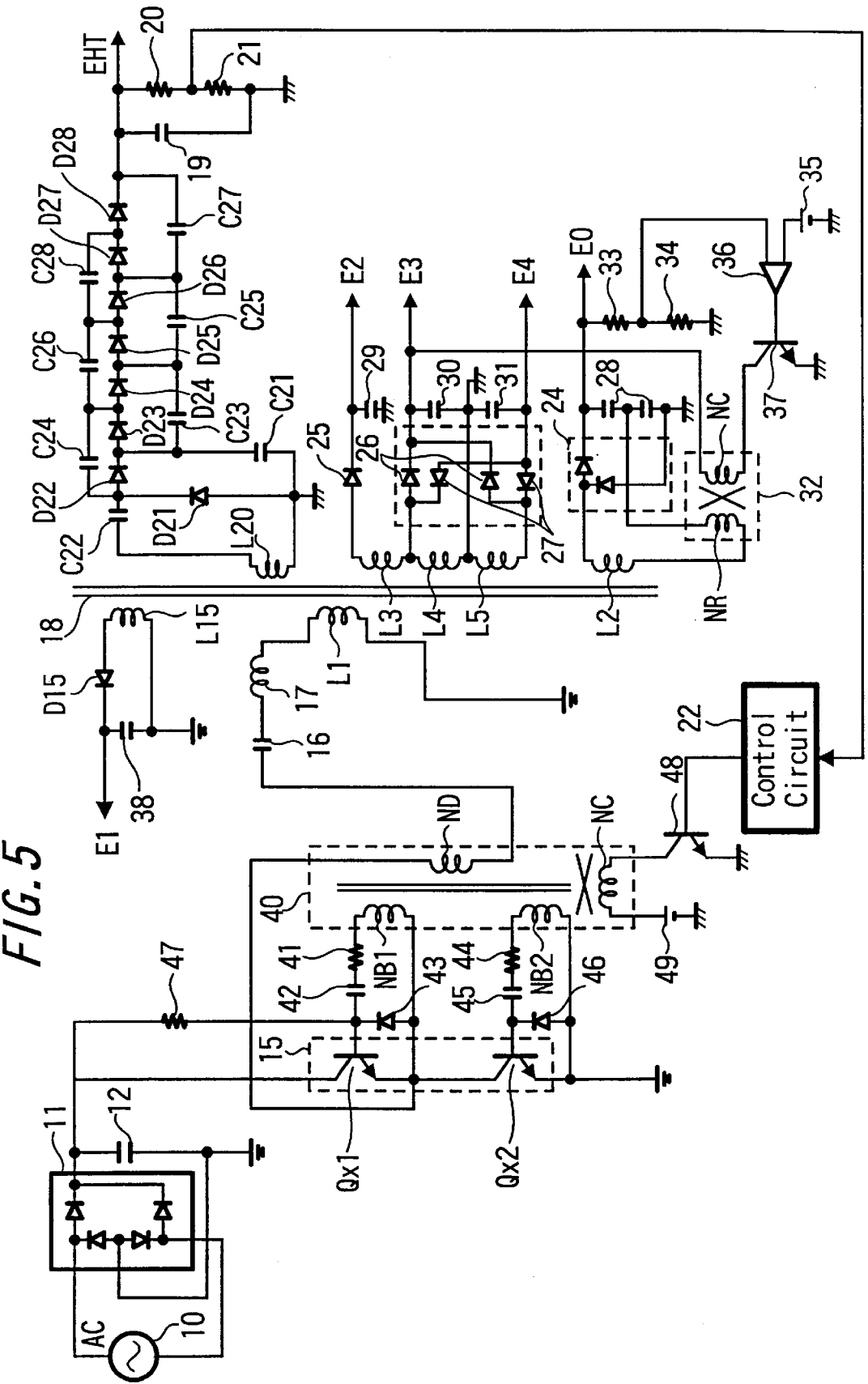
FIG. 5 is a constructional view illustrating a third embodiment of the switching power source apparatus according to the present invention.

Namely, in FIG. 5, the switching circuit part 15 is constructed using, for example, a bipolar transistor arrangement of transistors Qx1 and Qx2. To the point of connection between the emitter of the transistor Qx1 and the collector of the transistor Qx2 there is connected the resonance capacitor 16. Further, an excitation winding ND of a drive transformer 40 as later described, the choke coil 17, and the primary winding L1 of the converter transformer 18 are connected in series to one another. Thereby, a self-excited type current resonance converter having the half-bridge type serial resonance circuit is formed.

Figure 6:
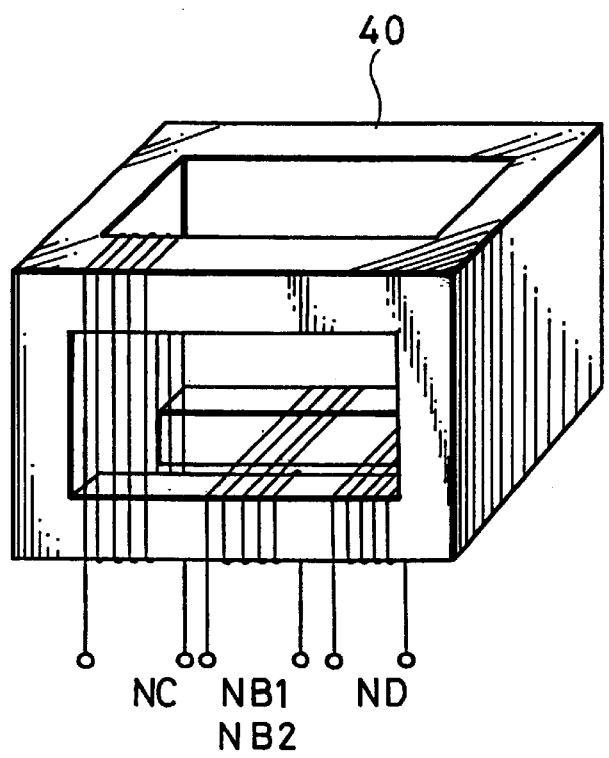
FIG. 6 is a view taken for explaining a main part thereof.

On the other hand, in this embodiment, there is provided the drive transformer 40 for driving the bipolar transistors Qx1 and Qx2 constituting the switching circuit part 15. Here, in the drive transformer 40, there is used, for example, an orthogonal-crossing type saturable reactor, which is constructed, as illustrated in, for example, FIG. 6, of drive windings NB1, NB2 and excitation winding ND and a control winding NC performing the control of the inductance of these windings, and these windings are being wound around the orthogonal-crossing type saturable reactor. It is to be noted that this drive transformer 40 is not limited to such an orthogonal-crossing type saturable reactor but may be constructed of a so-called "EI type", for example.

To one end of one drive winding NB1 of the drive transformer 40 there are connected a resistor 41 and a resonance capacitor 42 so as to form a serial resonance circuit. And the drive transformer 40 is connected to the base of the transistor Qx1 constituting the switching circuit part 15 through this serial resonance circuit. Also, the other end of the drive winding NB1 is connected to the emitter of the transistor Qx1. Further, between the base and emitter of the transistor Qx1, there is provided a diode 43 for use as a damper.

Also, the other drive winding NB2 of the drive transformer 40 is provided so as to become opposite in polarity to the drive winding NB1. To one end of this drive winding NB2 there are connected a resistor 44 and a resonance capacitor 45 so as to form a serial resonance circuit. And through this serial resonance circuit the one end of this drive winding NB2 is connected to the base of the transistor Qx2 constituting the switching circuit part 15. The other end is connected to the earth. Further, between the base and emitter of the transistor Qx2, there is provided a diode 46 for use as a damper.

As a result of this, according to the outputs of the drive windings NB1, NB2 of the drive transformer 40, there are driven the transistors Qx1, Qx2 constituting the switching circuit part 15. By the switching frequency fsw4 as later described for driving the transistors Qx1 and Qx2 being subjected to variable control, the output voltage obtained through the inverter transformer 18 of a succeeding stage is subjected to conversion-to-constant voltage control. Namely, a self-excited type frequency control circuit is constructed so as to perform this conversion to constant voltage control.

Thereupon, the switching operation of the current resonance type power source circuit according to the above-described construction is performed as follows. First, upon closure of the commercially available alternating power source 10, a starting current is supplied to the base of the transistor Qx1 through a resistor 47 for effecting a starting. Assume here that the transistor Qx1 has become "on". Then, using the rectified output voltage from the capacitor 12 as a direct current power source, through the transistor Qx1, a positive-polarity resonance current flows through the resonance capacitor 16, drive winding ND, choke coil 17, and primary winding L1 of the converter transformer 18.

Further, when this resonance current becomes zero, a positive pulse is generated in the drive winding NB2 of the drive transformer 40 so as to make the transistor Qx2 "on". Conversely, a negative pulse is generated in the drive winding NB1 of the drive transformer 40 so as to make the transistor Qx1 "off". Resultantly, the transistor Qx1 immediately becomes "off" and the transistor Qx2 becomes "on". As a result, through the transistor Qx2, a negative-polarity resonance current flows through the resonance capacitor 16, drive winding ND, choke coil 17, and primary winding L1 of the converter transformer 18.

In this way, the transistors Qx1 and Qx2 constituting the switching circuit part 15 repeatedly alternately become "on" and "off" according to the switching frequency fsw4. Thereby, the positive/negative-polarity excitation currents are supplied to the primary winding L1 of the converter transformer 18. As a result of this, desired alternating outputs are taken out from the secondary side windings of the converter transformer 18.

Here, the converter transformer 18 is constructed of the primary winding L1 to that the above-described excitation current is supplied, the secondary winding L20 for obtaining a high-level output voltage, and the secondary windings L2 to L5 and secondary winding L15 for obtaining the other voltages. To the secondary winding L2 there is connected the saturable reactor 32 that serves as means for performing the conversion-to-constant-voltage control of the same +B voltage E0 as stated previously. Also, to the secondary winding L20 there is connected a multi-time voltage-increasing rectification circuit such as a Cockcroft-Walton circuit that is constructed of diodes D21 to D28 and smoothing capacitors C21 to C28. The relevant construction is so made as to obtain the high-level output voltage EHT.

And, in this apparatus, the conversion to constant voltage control of the high-level output voltage EHT is performed as follows. Namely, assume, for example, that the high-level output voltage EHT that has been taken out from the 8-time voltage-increasing Cockcroft-Walton circuit constructed of the secondary winding L20, diodes D21 to D28, and smoothing capacitors C21 to C28 has fluctuated so as to increase. Then, this fluctuation of voltage is detected by the voltage detection circuit constructed of the resistors 20 and 21. Thereafter, the collector current of the control transistor 48 is so controlled as to increase through the control signal obtained from the control circuit 22.

Here, one end of the control winding NC of the above-described drive transformer 40 is connected to the collector of the transistor 48 while the other end thereof is connected to a voltage source 49. Accordingly, this collector current acts as the control current to thereby control the control current flowing through the control winding NC of the drive transformer 40 that is constructed of the saturable reactor so as for this control current to increase. Thereby, the drive transformer 40 tends to get saturated and thereby acts to cause the decreases in the inductance of the drive windings NB1 and NB2. As a result, the oscillation frequency of the self-excited oscillation circuit becomes high, with the result that the switching frequency fsw4 is so controlled as to increase.

On the other hand, assuming that f04 represents the resonance frequency that is formed by the above-described resonance capacitor 16, choke coil 17, and primary winding L1 of the converter transformer 18, because the switching frequency fsw4 is set to within a range higher than the resonance frequency f04 as in the case of the above-described circuit, the increase in the switching frequency results in that the switching frequency goes away from the resonance frequency fsw4. Thereby, the excitation current supplied to the primary winding L1 is suppressed. Thereby, the conversion to constant voltage of the high-level output voltage EHT that is taken out from the secondary winding L20 is achieved.

Further, the conversion to constant voltage of the output voltage E0 taken out from the secondary winding L2 of the converter transformer 18 is performed as follows. To the secondary winding L2 there is connected the saturable reactor 32 for performing the conversion-to-constant-voltage control. This saturable reactor 32 is constructed of the control winding NC and the controlled winding NR. To the secondary winding L2 there is connected in series the controlled winding NR. In this state, the control current corresponding to the control signal is made to flow into the control winding NC in corresponding relationship to the fluctuation of the output voltage E0. Thereby, the inductance of the controlled winding NR is controlled.

Namely, assume that the output voltage E0 has fluctuated so as to increase for the reason that the load conditions of this output voltage E0 change, etc. Then, as stated above, the control current flowing into the control winding NC is controlled so as to decrease through the control signal corresponding to the fluctuation of the voltage. As a result, the control current acts so that the inductance of the controlled winding NR of the saturable reactor 32 may increase. Thereby, the excitation current flowing through the primary winding L2 of the converter transformer 18 is suppressed through the control of the inductance, whereby the conversion to constant voltage is achieved. It is to be noted that the remaining operations are performed in the same way as in the above-described first embodiment.

Accordingly, in this apparatus, also, it is arranged to adopt means for decreasing the loss of power of the switching power source part and improving the conversion efficiency. In other words, it is arranged to adopt control means that causes the operation of the switching output circuit for performing its switching operation with a small loss of power, and that is connected to the switching output circuit for performing the above-described switching operation to thereby perform the switching frequency control and the inductance control able to be performed with a small loss of power. According to this construction, it is possible to provide a switching power source apparatus that can be put to practical use.

As a result of this, while the conventional switching power source apparatus has, as a first drawback, the problem of the loss of power in the switching circuit part and, as a second drawback, the problem of the conversion efficiency in the switching converter output transformer part, the invention enables easily solving these problems.

Further, a fourth embodiment of the invention will now be explained with reference to FIG. 7. It is to be noted that in this embodiment a parallel resonance circuit is constructed, thereby a circuit operation equivalent to that performed in each of the above-described embodiments is realized using a voltage resonance type switching converter circuit.

Figure 7:
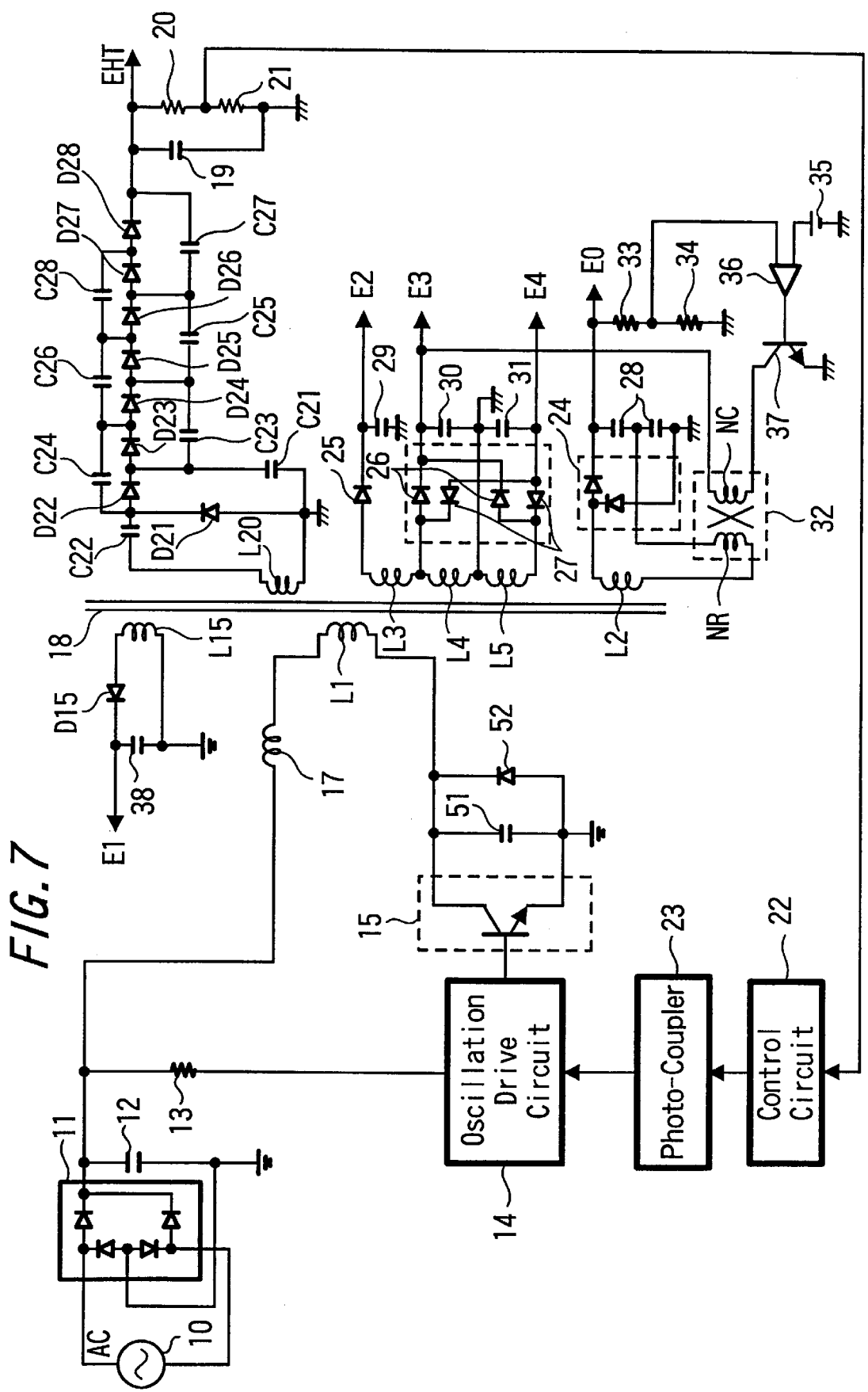
FIG. 7 is a constructional view illustrating a fourth embodiment of the switching power source apparatus according to the present invention.

Namely, in FIG. 7, the switching circuit part 15 is constructed using one piece of switching element. And, a resonance capacitor 51 and a damper diode 52 are connected in parallel to the switching element of the switching circuit part 15. The rectified output voltage of the commercially available alternating power source 10 is supplied to one end of the primary winding L1 of the converter transformer 18 through the choke coil 17. The other end of the primary winding L1 of the converter transformer 18 is connected to the collector of the switching element of the switching circuit part 15.

Further, through the resistor 13, a power source voltage is supplied to the oscillation drive circuit 14, and, from the oscillation drive circuit 14, a drive pulse is sent to the base of the switching element of the switching circuit part 15. Supplying this drive pulse performs the "on"/"off" control of the switching element of the switching circuit part 15, with the result that a resonance voltage generates in the collector of the switching element of the switching circuit part 15. Simultaneously, the resonance current is supplied to the primary winding L1 of the converter transformer 18. The rest is constructed in the same way as in the above-described embodiment of FIG. 5.

And, in this apparatus, the conversion to constant voltage control of the output voltages is performed through the same operation as in the first embodiment illustrated in FIG. 1. In this way, in this fourth embodiment, the parallel resonance circuit is constructed, thereby a circuit operation equivalent to that performed in each of the above-described embodiments can be realized using the voltage resonance type switching converter circuit.

Accordingly, in this apparatus, also, it is arranged to adopt means for decreasing the loss of power of the switching power source part and improving the conversion efficiency. In other words, it is arranged to adopt control means that causes the operation of the switching output circuit for performing its switching operation with a small loss of power, and that is connected to the switching output circuit for performing its switching operation to thereby perform the switching frequency control and the inductance control able to be performed with a small loss of power. According to this construction, it is possible to provide a switching power source apparatus that can be put to practical use.

As a result of this, while the conventional switching power source apparatus has, as a first drawback, the problem of the loss of power in the switching circuit part and, as a second drawback, the problem of the conversion efficiency in the switching converter output transformer part, the invention enables easily solving these problems.

As described above, according to the above-described switching power source apparatus, this apparatus is equipped with switching means for performing its switching operation using a direct current voltage as the operating power source, oscillation drive means that is connected to the switching means to thereby drive the switching operation at a given value of frequency, a primary winding that is resonance driven by the switching operation of the switching means, first control means that controls the oscillation frequency of the oscillation drive means by the use of a control signal obtained from a first rectification circuit output that is connected to a first secondary winding disposed with respect to the primary winding, a saturable reactor that is connected to a second secondary winding disposed with respect to the first winding, and second control means that controls the inductance of the saturable reactor by the use of a control signal obtained from a second rectification circuit output that is connected to the saturable reactor. As a result of this, it is possible to provide a switching power source apparatus that can be put to practical use by solving the problem of the loss of power in the switching circuit part and the problem of the conversion efficiency in the switching converter output transformer part.

Also, according to the above-described switching power source apparatus, this apparatus is equipped with switching means for performing its switching operation using a direct current voltage as the operating power source, oscillation drive means that is connected to the switching means to thereby drive the switching operation at a given value of frequency, a first primary winding that is resonance driven by the switching operation of the switching means to thereby construct a first converter transformer, first control means that controls the oscillation frequency of the oscillation drive means by the use of a control signal obtained from a first rectification circuit output that is connected to a first secondary winding disposed with respect to the first primary winding, a second primary winding that is provided in parallel with respect to the first primary winding to thereby construct a second converter transformer, a saturable reactor that is connected in series to the second primary winding, and second control means that controls the inductance of the saturable reactor by the use of a control signal obtained from a second rectification circuit output that is connected to a second secondary winding disposed with respect to the second primary winding. As a result of this, it is possible to provide a switching power source apparatus that can be put to practical use by solving the problem of the loss of power in the switching circuit part and the problem of the conversion efficiency in the switching converter output transformer part.

Figure 8A:
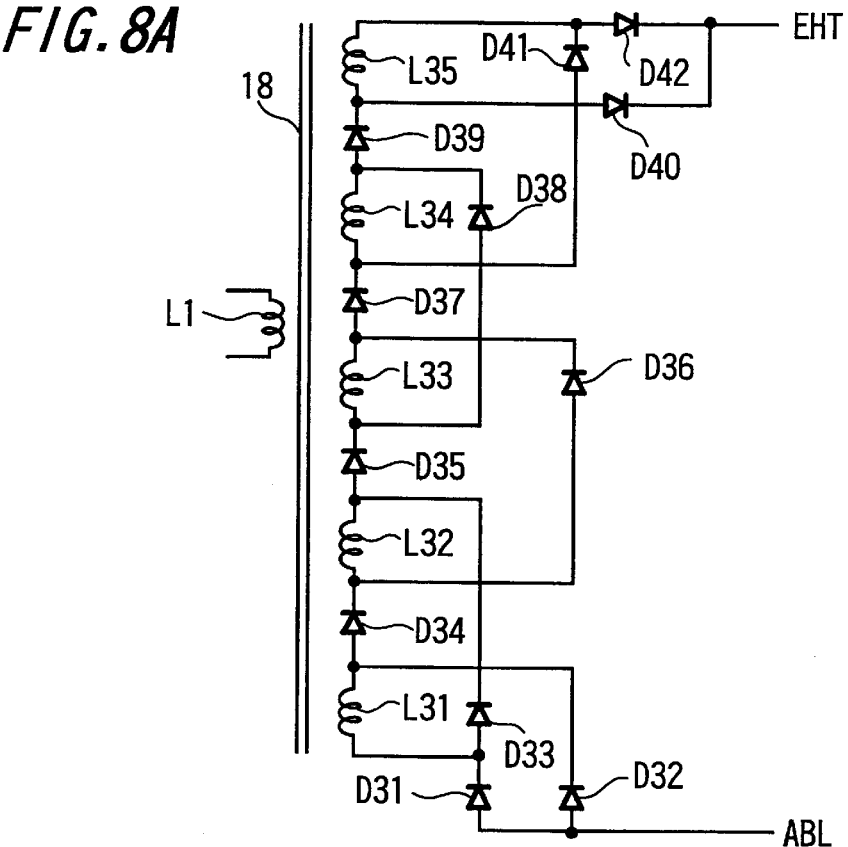
FIGS. 8A and 8B are views taken for explaining a construction thereof.
Figure 8B:
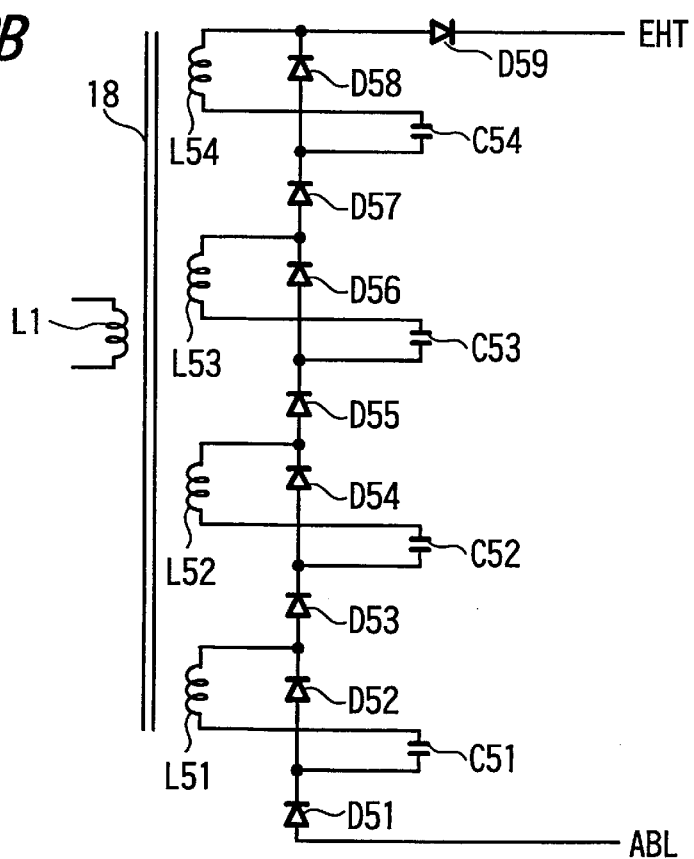
Figure 9:
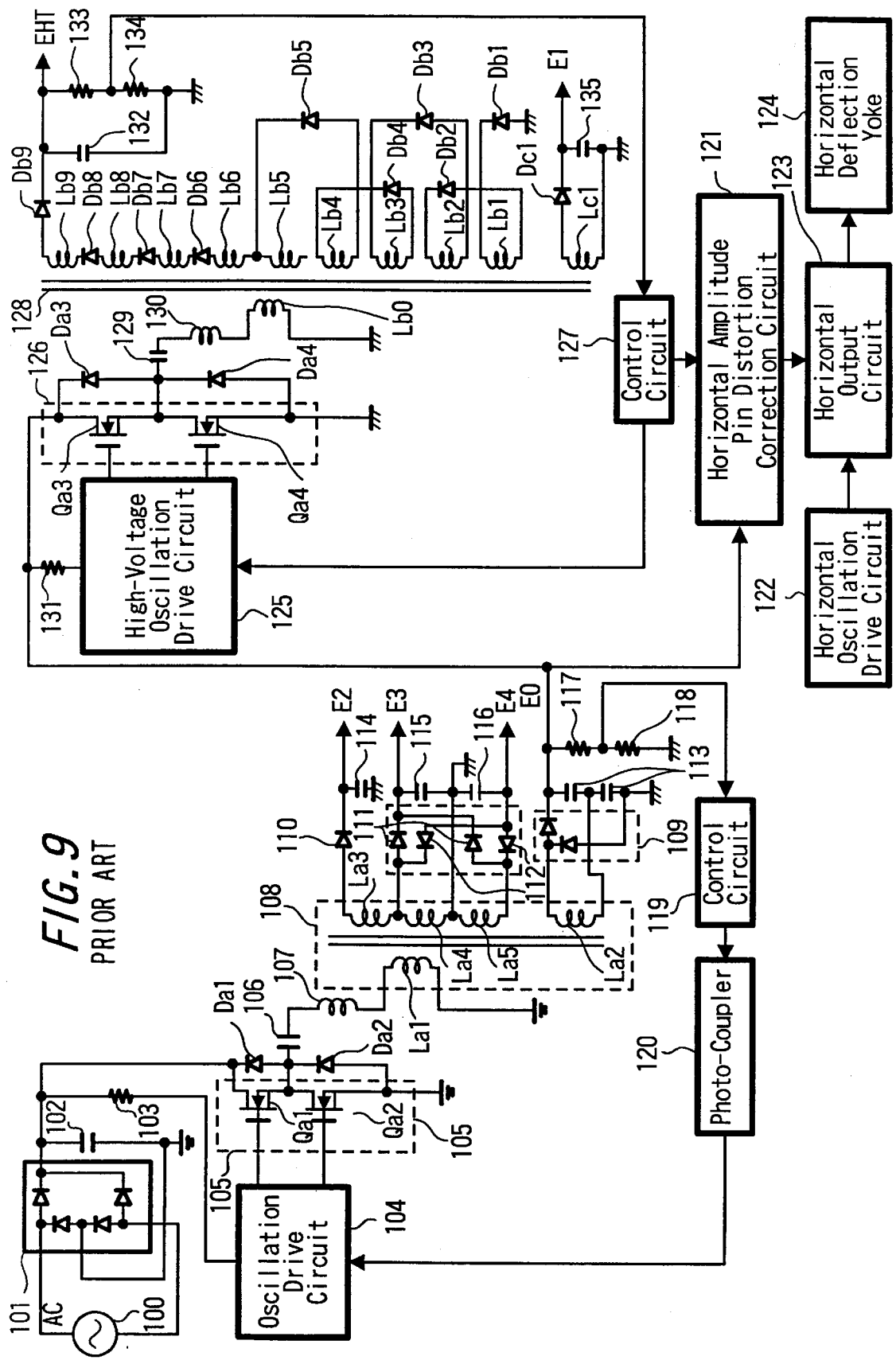
FIG. 9 is a constructional view illustrating a conventional switching power source apparatus.
Figure 10A:
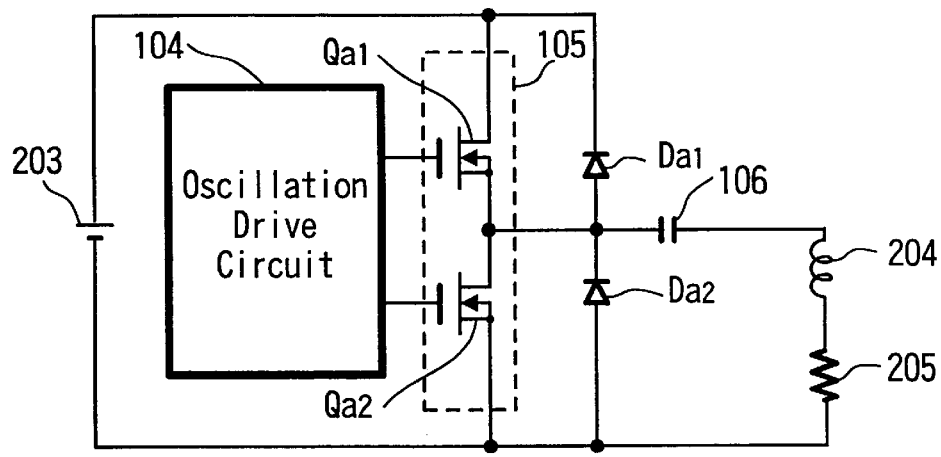
FIGS. 10A to 10C are views taken for explaining an operation thereof.
Figure 10B:
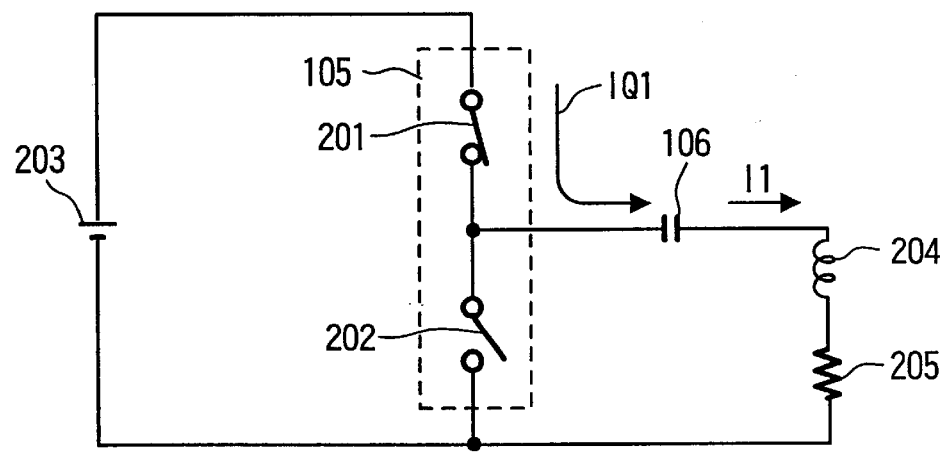
Figure 10C:
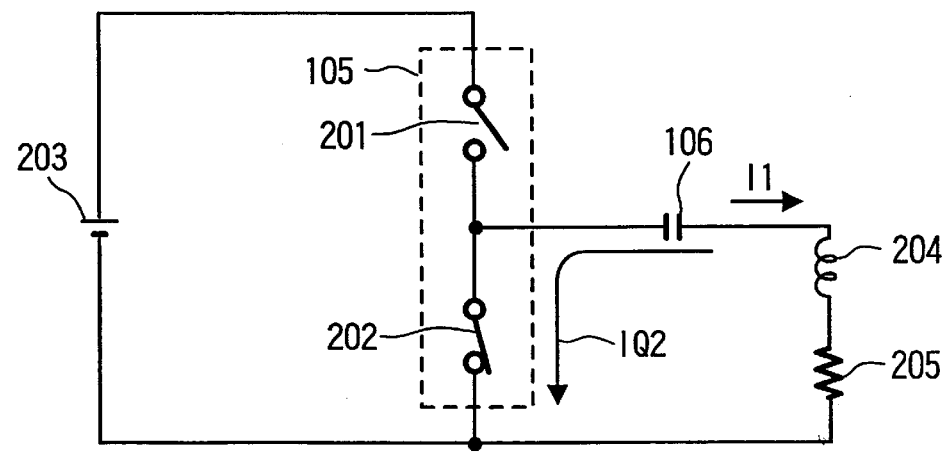
Figure 11A:
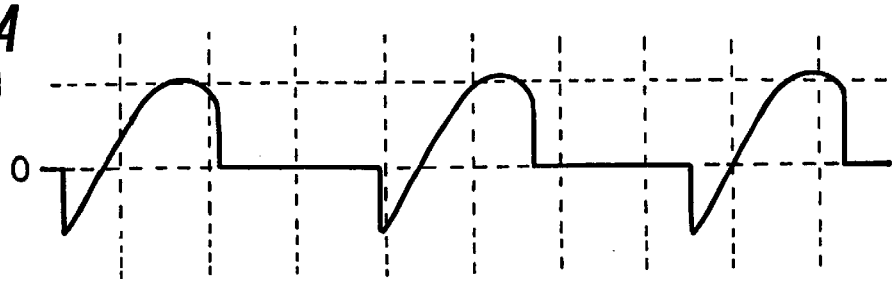
Figure 12:
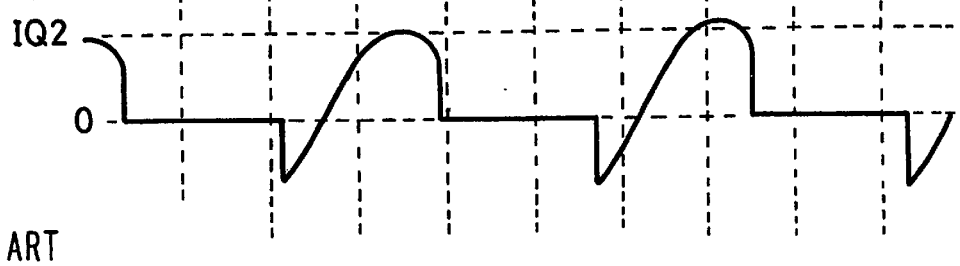
FIG. 12 is a characteristic view taken for explanation thereof.
Figure 12:
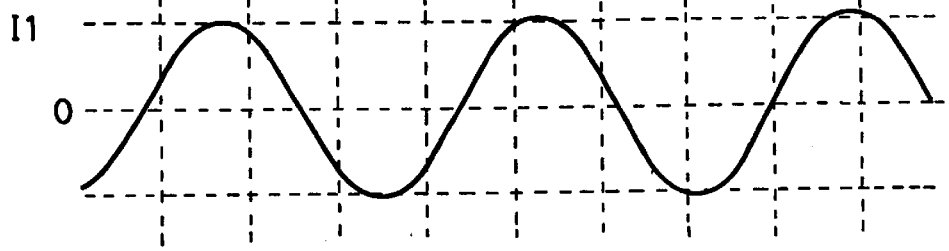
Figure 12:
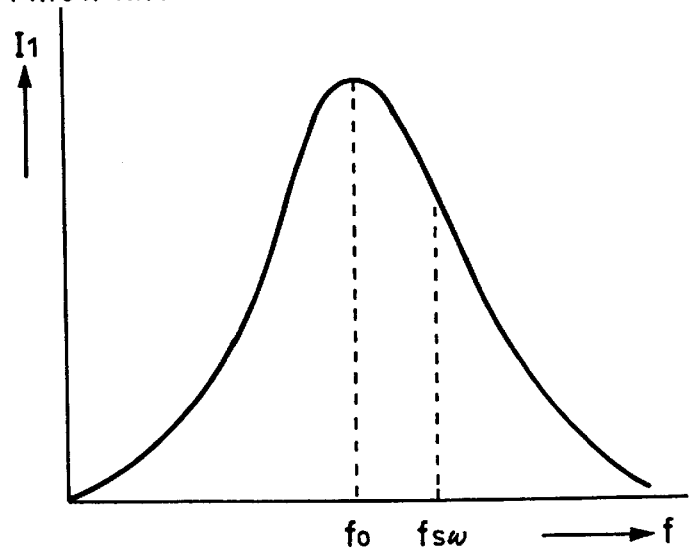
Figure 13:
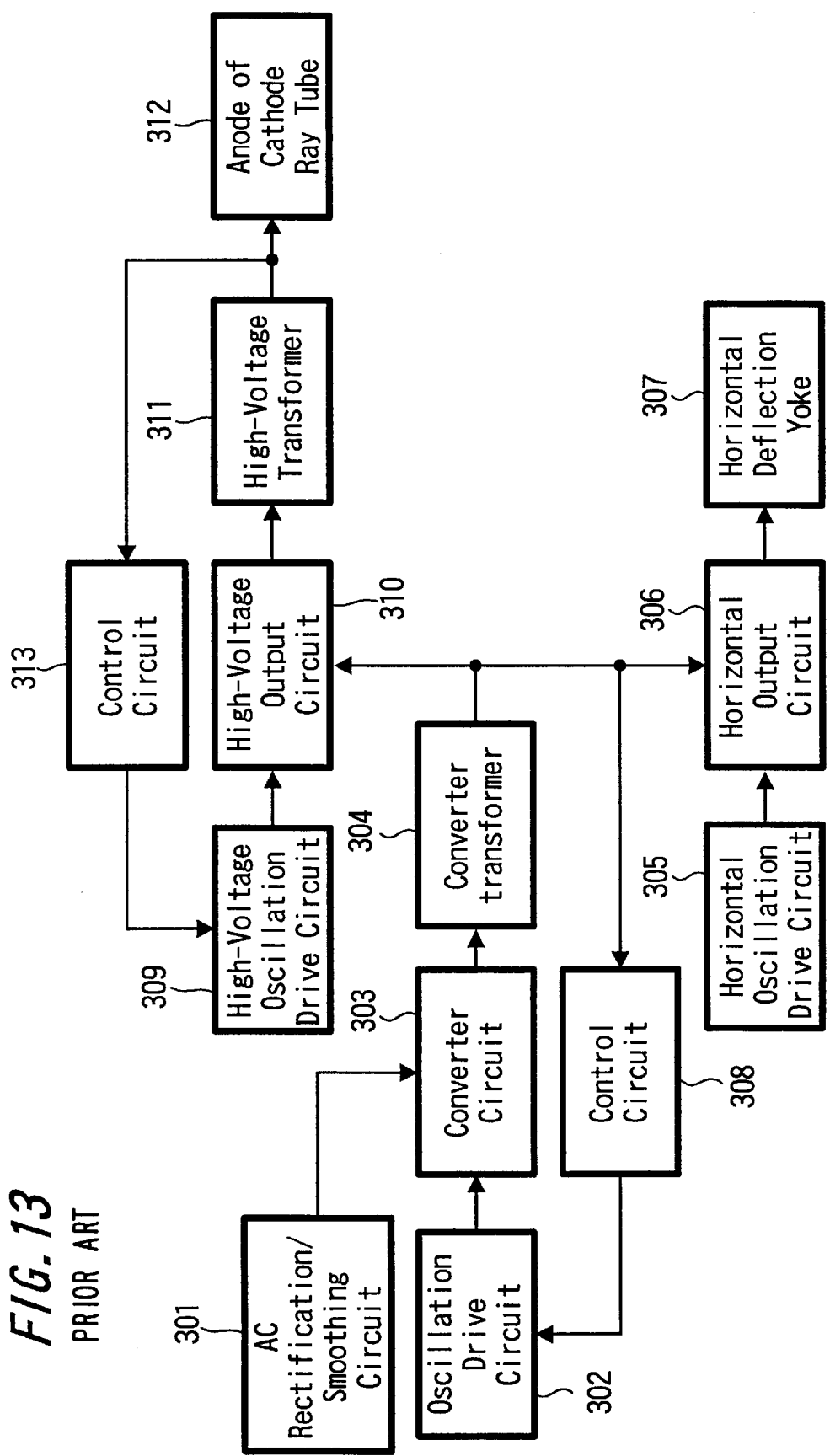
FIG. 13 is a block diagram illustrating an entire construction of the conventional apparatus.

Incidentally, the present invention is not limited to the constructions of the above-described embodiments. The system of the resonance type converter may have a construction that has been suitably changed. Further, the high-voltage rectification circuit of the high-voltage generation circuit is not limited to the constructions of the above-described embodiments. The high-voltage rectification circuit may have a construction as that of a multi-time voltage-increasing circuit or may have a construction that has been suitably changed from the construction of a high-voltage rectifying system constructed of two or more divided secondary windings of the high-voltage transformer and two or more rectification diodes and capacitors, such as that illustrated in FIG. 8A or FIG. 8B.

Also, According to the present invention, instead of the such an arrangement, that is, the converter transformer is made up into a non-insulated type one, and there is equipped the rectifying/smoothing means that generates a rectified and smoothed voltage using as its charging current the rectified current obtained by rectifying the commercially available alternating power source, there is obtained the same effect even when, there is made up a construction wherein there is provided means for supplying a direct current voltage from the outside to thereby provide switching means for performing its switching operation using this direct current voltage as the operating power source.

As has been explained above, according to the present invention, using a resonance type converter that enables the performance of the high-frequency switching operation and that has a feature in that the waveform of the switching output current and that of the switching output voltage are very smooth, thereby the switching noise and switching loss are small in magnitude, there is formed one system of converter output circuit. Using this converter output circuit, the conversion to constant voltage of the principal voltage is performed with the use of the frequency control means. Simultaneously, there is additionally provided the inductance control means that uses the saturable reactor and that has a feature in that the switching noise and switching loss are small in magnitude. And, using this inductance control means, the conversion to constant voltage control of the other principal voltages is realized. This enables the conversion to constant voltage of a plurality of the output voltages each with a large fluctuation in load, through the construction of the largely simplified switching circuit. The present invention provides the solving means that is very effective in that sense.

As a result of this, the following effect has been brought about. Namely, the high-voltage generation circuit the output voltage of that is high in level and largely fluctuates due to the fluctuation in the level of load and the power source circuit for supplying the other voltages are respectively simultaneously equipped with the frequency control means using the resonance type converter wherein the switching noise and switching loss are small in magnitude and the control means using the saturable reactor wherein the operation loss is small. Further, with a simplified circuit construction, the high-voltage generation circuit and the power source circuit for supplying the other voltages are operationally unified together. The invention has thereby enabled obtaining a high-voltage output directly from the converter transformer of the power source circuit part. As a result of this, the invention has a construction to achieve the direct current/direct current conversion, which was doubly performed in such a way as to obtain a high-voltage output from a high-voltage transformer using as the power source voltage the +B voltage that is obtained from the converter transformer and subjected to conversion to the constant voltage, through the direct current/direct current conversion that is once performed as stated above. The invention has thereby enabled greatly improving the conversion efficiency.

In this way, the present invention has the construction of the power source circuit that is equipped with the resonance type converter and the control-to-constant voltage saturable reactor to thereby integrate the insulated type constant-voltage power source circuit and the high-voltage generation circuit. Thereby, the switching power source apparatus of the present invention advantageously becomes low in noise and in cost, and becomes able to be made smaller in size and in weight through the high-frequency switching operation. In addition, through the simplification of the construction of the switching circuit and transformer, the invention has enabled greatly improving the conversion efficiency to thereby provide the advantage that the saving of the electric power needed for use in the product can be achieved.

Further, according to the invention as described above, it is arranged to adopt means for decreasing the loss of power of the switching power source part and improving the conversion efficiency. In other words, it is arranged to adopt control means that causes the operation of the switching output circuit for performing its switching operation with a small loss of power, and that is connected to the switching output circuit for performing its switching operation to thereby perform the switching frequency control and the inductance control able to be performed with a small loss of power. Thereby, it is advantageously possible to solve the problem of the loss of power in the switching circuit part and the problem of the conversion efficiency in the switching converter output transformer part and thereby provide a switching power source apparatus that can be put to practical use.

Also, according to the invention as described above, the primary winding and the first and second secondary windings are provided in a single converter transformer. Thereby, it is advantageously possible to solve the problem of the conversion efficiency in the switching circuit part and the problem of the conversion efficiency in the switching converter output transformer part and thereby provide a switching power source apparatus that can be put to practical use.

Also, according to the invention as described above, in the oscillation drive means, there is provided a separately-excited frequency control circuit. Thereby, it is advantageously possible to solve the problem of the loss of power in the switching circuit part and the problem of conversion efficiency in the switching converter output transformer part and thereby provide a switching power source apparatus that can be put to practical use.

Also, according to the invention as described above, the driving performed with switching of the switching means is performed by the resonance capacitor being connected in series to the primary winding so as to cause the switching means to perform its switching operation as a current resonance type. Thereby, it is advantageously possible to solve the problem of the loss of power in the switching circuit part and the problem of the conversion efficiency in the switching converter output transformer part and thereby provide a switching power source apparatus that can be put to practical use.

Also, according to the invention as described above, the first rectification circuit is made up as a multi-time voltage-increasing rectification circuit, and the first control means control the oscillation frequency of the oscillation drive means using a control signal obtained from an output of said multi-time voltage-increasing rectification circuit. Thereby, it is advantageously possible to solve the problem of the loss of power in the switching circuit part and the problem of the conversion efficiency in the switching converter output transformer part and thereby provide a switching power source apparatus that can be put to practical use.

Also, according to the invention as described above, as the operating power source there is used a power source that is obtained from a rectification/smoothing power source circuit for generating a rectified and smoothed voltage using as its charging current a rectified current obtained by rectifying a commercially available alternating power source, and/or, a direct current power source circuit having externally supplied thereto a direct current voltage. Thereby, it is advantageously possible to solve the problem of the loss of power in the switching circuit part and the problem of the conversion efficiency in the switching converter output transformer part and thereby provide a switching power source apparatus that can be put to practical use.

Resultantly, while the conventional switching power source apparatus had, as the first drawback, the problem of the loss of power in the switching circuit part and, as the second drawback, the problem of the conversion efficiency in the switching converter output transformer part, the present invention enables easily solving these problems.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A switching power source apparatus comprising
switching means for performing a switching operation using a direct current voltage as an operating power source;
oscillation drive means connected to the switching means to thereby perform the switching operation at a given oscillation frequency;
a primary winding driven under a resonance state by the switching operation of the switching means;
first control means for controlling the oscillation frequency of the oscillation drive means by the use of a control signal obtained from an output of a first rectification circuit connected to a first secondary winding with respect to the primary winding;
a saturable reactor connected to a second secondary winding with respect to the first secondary winding; and
second control means for controlling an inductance of the saturable reactor by the use of a control signal obtained from an output of a second rectification circuit connected to the saturable reactor.

2. The switching power source apparatus according to claim 1, wherein
the primary winding and the first and second secondary windings are provided in a single converter transformer.

3. The switching power source apparatus according to claim 1, wherein
in the oscillation drive means there is provided a separately-excited frequency control circuit.

4. The switching power source apparatus according to claim 1, wherein
the switching of the switching means is performed by a resonance capacitor connected in series to the primary winding so as to cause the switching means to perform its switching operation as a current resonance type.

5. The switching power source apparatus according to claim 1, wherein
the first rectification circuit comprises a multi-time voltage-increasing rectification circuit and the first control means controls the oscillation frequency of the oscillation drive means using a control signal obtained from an output of the multi-time voltage-increasing rectification circuit.

6. The switching power source apparatus according to claim 1, wherein
as an operating power source there is used one of a power obtained from a rectification/smoothing power source circuit for generating a rectified and smoothed voltage using as a charging current a rectified current obtained by rectifying a commercially available alternating power source, and a direct current power source circuit having externally supplied thereto a direct current voltage.

7. A switching power source apparatus comprising
switching means for performing a switching operation using a direct current voltage as an operating power source;

oscillation drive means connected to the switching means to thereby perform the switching operation at a given oscillation frequency;

a first primary winding driven under a resonance state by the switching operation of the switching means and forming part of a first converter transformer;

first control means for controlling the oscillation frequency of the oscillation drive means by a control signal obtained from an output of a first rectification circuit connected to a first secondary winding with respect to the first primary winding;

a second primary winding provided in parallel with respect to the first primary winding and forming part of a second converter transformer;

a saturable reactor connected in series to the second primary winding; and second control means for controlling an inductance of the saturable reactor by a control signal obtained from an output of a second rectification circuit that is connected to a second secondary winding arranged relative to the second primary winding.

8. The switching power source apparatus according to claim 7, wherein in the oscillation drive means there is provided a separately-excited frequency control circuit.

9. The switching power source apparatus according to claim 7, wherein the switching of the switching means is performed by a resonance capacitor connected in series to the primary winding so as to cause the switching means to perform its switching operation as a current resonance type.

10. The switching power source apparatus according to claim 7, wherein the first rectification circuit comprises a multi-time voltage-increasing rectification circuit and the first control means controls the oscillation frequency of the oscillation drive means using a control signal obtained from an output of the multi-time voltage-increasing rectification circuit.

* * * * *